(12) United States Patent
Finateu et al.

(10) Patent No.: US 12,532,086 B2
(45) Date of Patent: Jan. 20, 2026

(54) GLOBAL AND CLUSTER CONTRAST DETECTION IN VISION NEUROMORPHIC SENSORS

(71) Applicant: PROPHESEE, Paris (FR)

(72) Inventors: Thomas Finateu, Veneux les sablons (FR); Farzaneh Shahrokhi, Paris (FR)

(73) Assignee: PROPHESEE, Paris (FR)

( * ) Notice: Subject to any disclaimer, the term of this patent is extended or adjusted under 35 U.S.C. 154(b) by 193 days.

(21) Appl. No.: 18/432,769

(22) Filed: Feb. 5, 2024

(65) Prior Publication Data

US 2024/0267642 A1 Aug. 8, 2024

(30) Foreign Application Priority Data

Feb. 6, 2023 (EP) .................... 23305156

(51) Int. Cl.
*H04N 25/47* (2023.01)
*H04N 25/00* (2023.01)
*H04N 25/42* (2023.01)
*H04N 25/46* (2023.01)
*H04N 25/706* (2023.01)
*H04N 25/707* (2023.01)
*H04N 25/709* (2023.01)
*H04N 25/75* (2023.01)
*H04N 25/78* (2023.01)

(52) U.S. Cl.
CPC ............ *H04N 25/47* (2023.01); *H04N 25/00* (2023.01); *H04N 25/42* (2023.01); *H04N 25/46* (2023.01); *H04N 25/706* (2023.01); *H04N 25/707* (2023.01); *H04N 25/75* (2023.01); *H04N 25/78* (2023.01); *H04N 25/709* (2023.01)

(58) Field of Classification Search
CPC ........ H04N 25/00; H04N 25/42; H04N 25/46; H04N 25/47; H04N 25/706; H04N 25/707; H04N 25/709; H04N 25/75; H04N 25/78
See application file for complete search history.

(56) References Cited

U.S. PATENT DOCUMENTS

| | | | |
|---|---|---|---|
| 8,735,795 B2* | 5/2014 | Qiao | H04N 25/766 250/214 AL |
| 9,661,242 B2* | 5/2017 | Goto | H04N 25/65 |
| 10,161,789 B2* | 12/2018 | Suh | H04N 25/707 |
| 2021/0152762 A1* | 5/2021 | Sakakibara | H04N 25/47 |
| 2023/0039144 A1* | 2/2023 | Chen | H04N 25/75 |
| 2025/0211867 A1* | 6/2025 | Zannoni | H04N 25/78 |

FOREIGN PATENT DOCUMENTS

| | | |
|---|---|---|
| EP | 3737084 A1 | 11/2020 |
| WO | 2021/217694 A1 | 11/2021 |

OTHER PUBLICATIONS

European Search Report in European Patent Application No. 23305156. 4, dated Apr. 19, 2023, 7 Pages.

* cited by examiner

*Primary Examiner* — Lin Ye
*Assistant Examiner* — Chriss S Yoder, III

(57) ABSTRACT

An event-based vision sensor comprises an array of pixel circuits, each configured to produce a respective photocurrent, wherein the array of pixel circuits is divided into one or more clusters of multiple pixel circuits; and a cluster control circuit configured, for each cluster, to generate (i) a summation of the photocurrents produced by the pixel circuits of the cluster and (ii) cluster events based on changes in the summation of the photocurrents.

14 Claims, 15 Drawing Sheets

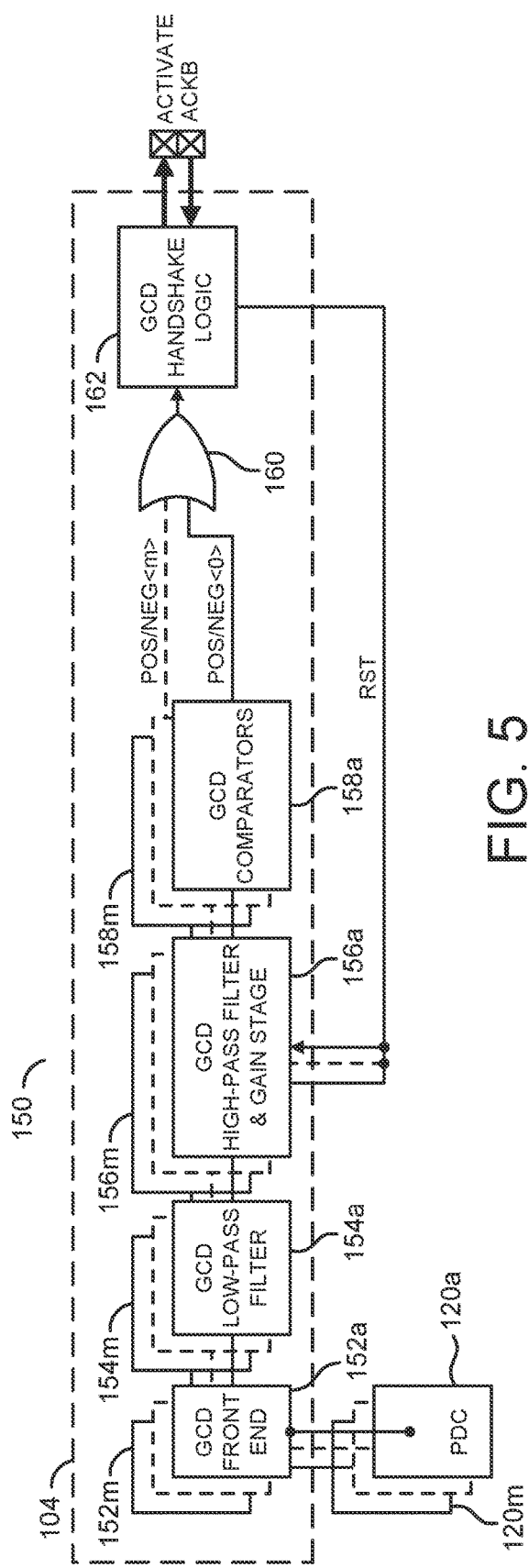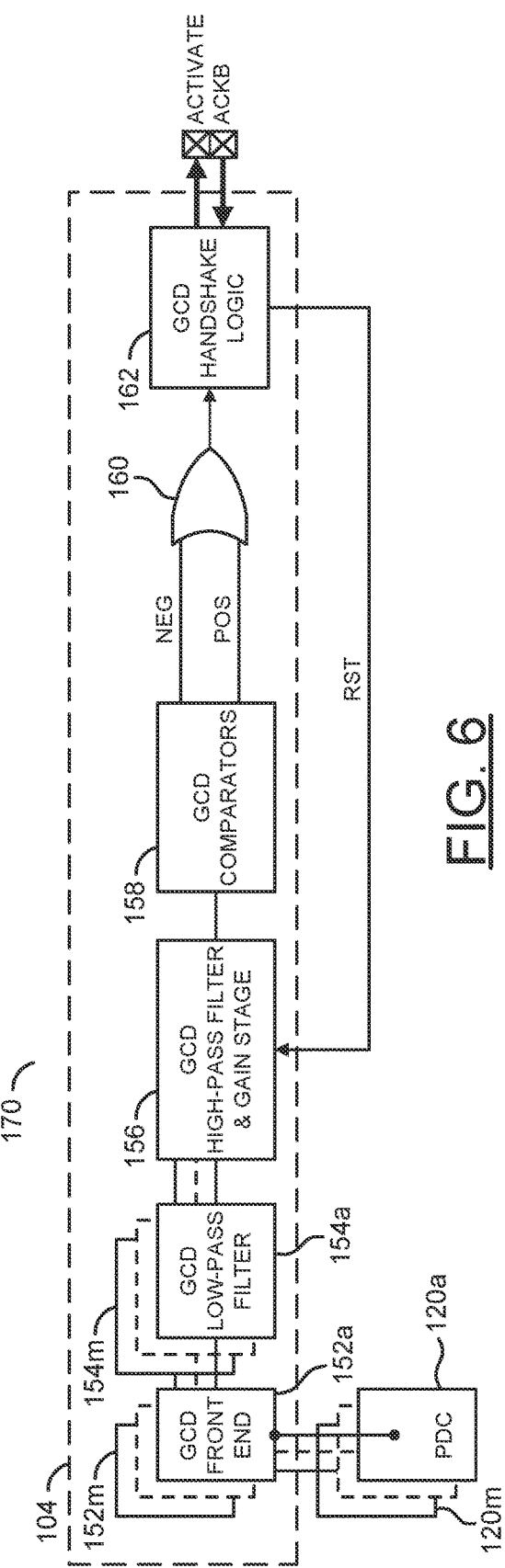

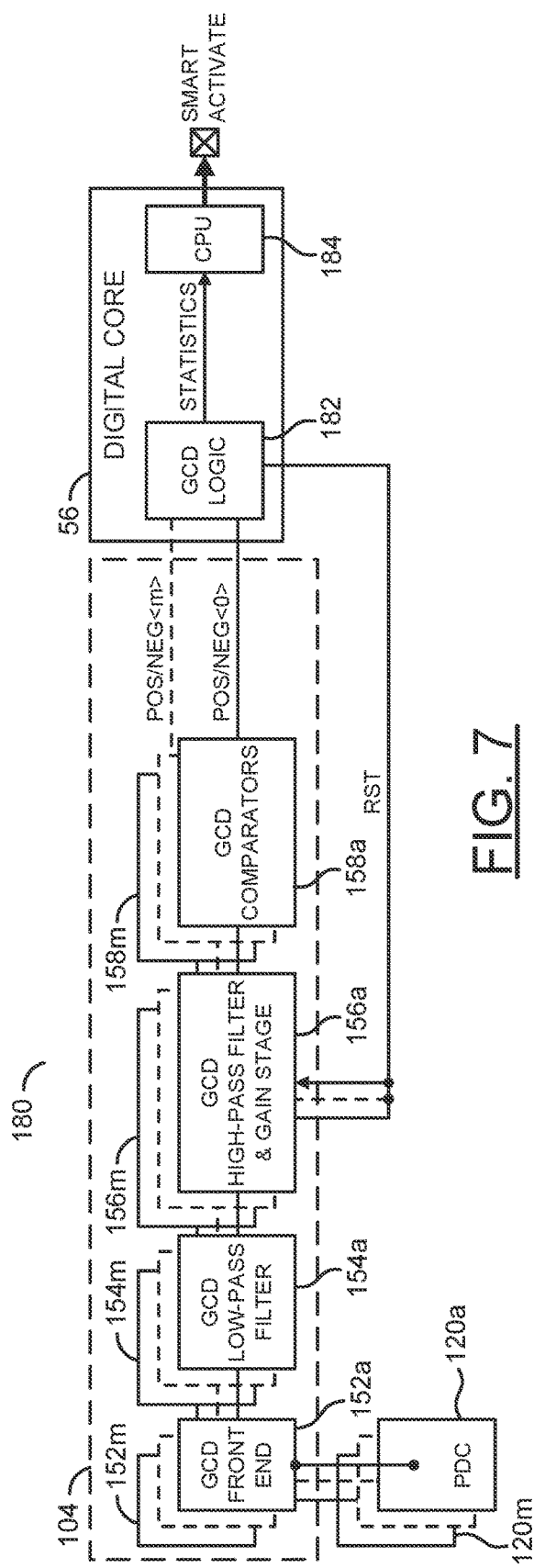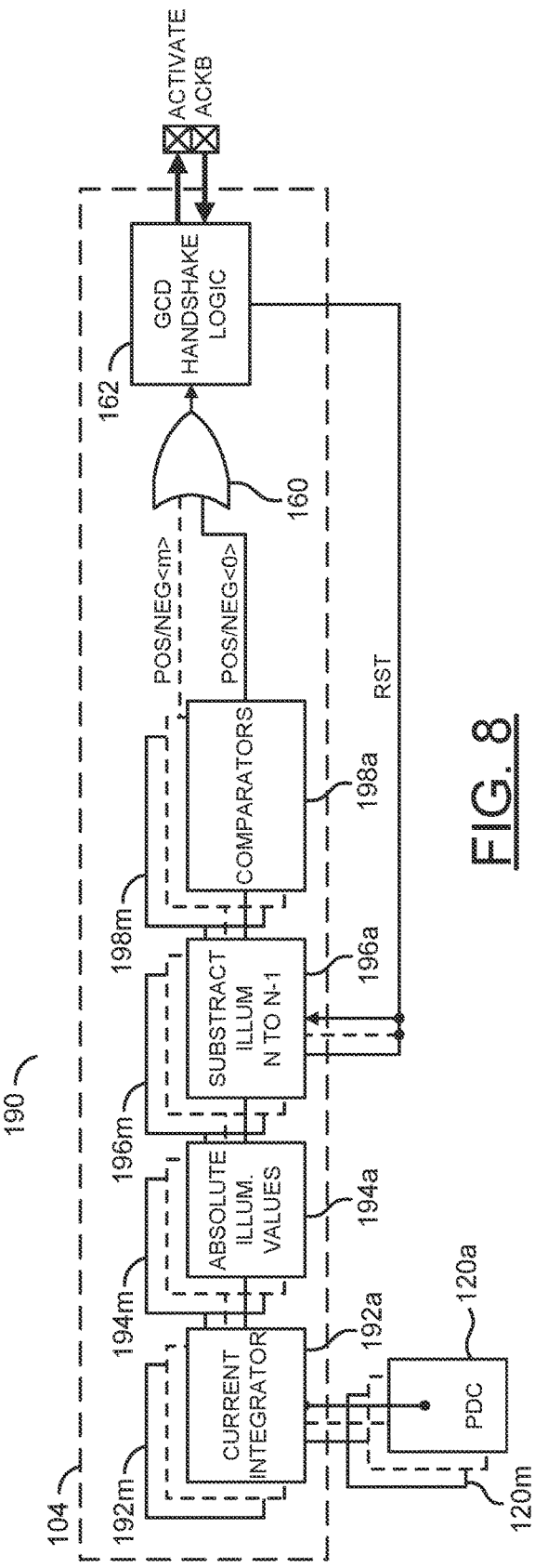

GLOBAL AND CLUSTER CONTRAST DETECTION IN VISION NEUROMORPHIC SENSORS

CROSS-REFERENCE TO RELATED APPLICATION

This application is based on and claims priority under 35 U.S.C. 119 to European patent application Ser. No. 23/305,156.4 filed on Feb. 6, 2023, the disclosure of which is herein incorporated by reference in its entirety.

FIELD OF THE INVENTION

The disclosure relates to event-based sensors generally and, more particularly, to a method and/or apparatus for implementing global and cluster contrast detection in vision neuromorphic sensors.

BACKGROUND

Event-based, vision sensors use contrast-detection to provide a new paradigm for acquiring dynamic visual information. Compared to frame-based image acquisition techniques, the main advantages of event-based sensors are low-latency response, wide-dynamic range operation and pixel-level data redundancy suppression. The frame-free operation of event-based sensors directly reduces data volume at the sensor output. The immediate benefits of temporal redundancy suppression are reductions in bandwidth, memory and computing power requirements for data transmission and post-processing.

In-pixel change detectors for event-based sensors are built around a fast, continuous-time logarithmic photoreceptor with asynchronous event-driven signal processing. The photocurrent is continuously monitored for changes. The event-based sensor responds to the changes in photocurrent with polarity-discriminated events that represent a relative increase or decrease in light intensity that exceeds tunable thresholds. Generally, the occurrence of events is sensed by one of two voltage comparators. The circuit responds to temporal contrasts over more than 6 decades of illumination (>120 dB). A signal waveform of light input may be analyzed by a change detector circuit to provide a voltage waveform at the node tracking the photocurrent. The event generation circuitry responds with pulse events of positive or negative polarity, respectively, to positive and negative gradients of the photocurrent. The rate of change is encoded in the inter-event intervals. The change detector responds to a relative change in illumination by triggering the transmission of an address-event via readout circuitry located at the periphery of the event-based vision sensor. When the readout acknowledges the change detector, the particular pixel circuit resets and the reference level after the reset is set to the current ambient light.

The event-based vision sensor relies on the contrast detection pixels. A contrast detection pixel front end is generally implemented by the photocurrent being issued from a photodiode and flowing via a transistor. A current source (e.g., IPR) allows proper biasing of the pixel front end. However, event-based sensors often require processing many events from a whole matrix to detect activity of interest. Upon strong activity, dynamic power cannot be neglected.

SUMMARY

An event-based vision sensor is generally provided, comprising an array of pixel circuits, each configured to produce a respective photocurrent, wherein the array of pixel circuits is divided into one or more clusters of multiple pixel circuits; and a cluster control circuit configured, for each cluster, to generate (i) a summation of the photocurrents produced by the pixel circuits of the cluster and (ii) cluster events based on changes in the summation of the photocurrents.

Each pixel circuit of a cluster may comprise a photodiode connected to generate the photocurrent of the pixel circuit between a ground and a node common to all pixel circuits of the cluster; and the cluster control circuit may comprise a cluster current sensor connected between the common node and a voltage source for measuring the summation of the photocurrents.

Each pixel circuit of a cluster may further comprise a transimpedance amplifier connected between the photodiode and the common node to sense the photocurrent, the transimpedance amplifier including a bias current source; and a bypass switch connected between the photodiode and the common node. The cluster control circuit is configured to control a mode of operation of the vision sensor, including (i) a normal mode where the bypass switches of all pixel circuits are turned off, whereby the vision sensor is capable of generating both individual pixel events and cluster events; and (ii) a standby mode where the bypass switches are turned on for a number of clusters and the current sources of the pixel circuits of the number of clusters are turned off, whereby the vision sensor is capable of generating only cluster events for the number of clusters while the pixel circuits of the number of clusters are inactive and consume no current.

The vision sensor may further comprise a digital core configured to process cluster events, wherein the cluster control circuit is configured to (i) in the standby mode, turn off the digital core and evaluate cluster events; (ii) when a cluster event indicates a threshold crossing, turn on the digital core to process the cluster events; and (iii) when the digital core determines that the cluster events match a condition, switch the vision sensor in normal mode.

BRIEF DESCRIPTION OF THE FIGURES

Embodiments of the disclosure will be apparent from the following detailed description and the appended claims and drawings.

FIG. 5 is a block diagram illustrating components of GCD circuits implementing relative illuminance sensors configured to generate summation or cluster events for each cluster of pixels;

FIG. 6 is a block diagram illustrating components of GCD circuits implementing relative illuminance sensors with a simplified front-end to generate a single summation event for all clusters of pixels;

FIG. 7 is a block diagram illustrating components of GCD circuits implementing relative illuminance sensors configured to provide summation events to an activated digital core;

FIG. 8 is a block diagram illustrating components of GCD circuits implementing absolute illuminance sensors configured to generate summation events for each cluster of pixels;

DETAILED DESCRIPTION OF THE EMBODIMENTS

Figure 1:
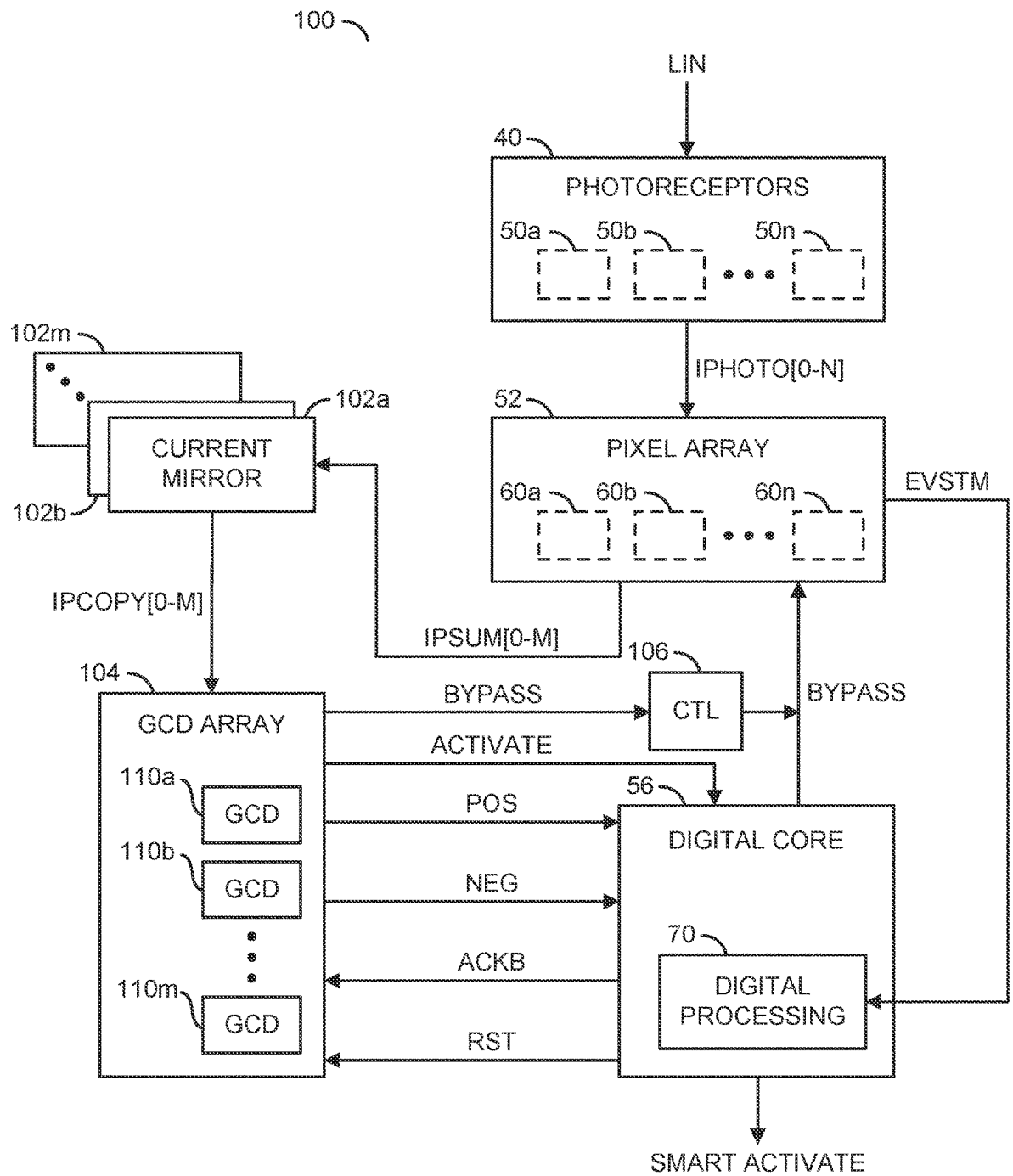
FIG. 1 is a block diagram illustrating an example embodiment of the present disclosure.

In event-based vision sensors, high event-throughput during peaks of activity can be difficult to process by digital/software resources. In addition, unwanted events hinder overall performance. For example, flicker noise can result in unwanted events. The unwanted events could partly or entirely be filtered and rejected during the digital or software post-processing. However, the power and computational cost associated with the unnecessary increase in pixel data output can be altogether avoided if a signal pre-analysis is performed upstream the digital processing.

It is provided herein to implement global and cluster contrast detection in vision neuromorphic sensors.

Embodiments of the present disclosure include providing global and cluster contrast detection in vision neuromorphic sensors that may (i) reduce power consumption, (ii) provide full-time awareness of photocurrent, (iii) enable a pixel circuit front end and a digital core to be independently activated and deactivated, (iv) detect changes in a sum of photocurrents, (v) monitor contrast changes of an entire scene, (vi) monitor contrast changes that correspond to clusters of pixels, (vii) use global contrast detection events to disable/enable reading out pixel circuits, (viii) provide low resolution information about contrast changes compared to a pixel circuit, (ix) provide filtering of events at particular frequencies and/or (x) be implemented as one or more integrated circuits.

Embodiments, of the present disclosure may be configured to provide full-time awareness of a photocurrent in an event-based sensor. The photocurrent issued by photodiodes may be monitored directly by a Global Contrast Detector (GCD) circuit. Implementing the global contrast detector circuit may enable the photocurrent to be monitored even while a pixel circuit front end is disabled. Disabling the pixel circuit front end may provide power savings.

Embodiments of the present disclosure may be configured to lower (or disable) current consumption in one or more pixel current consumption paths in an event-based sensor. In one example, all currents in a pixel circuit may be disabled. For example, the IPR current may be turned on (along with other current sources of a pixel circuit) when the pixel circuit is turned on and functional, or the IPR current may be turned off while a bypass switch may determine a current path of a summed photocurrent. Implementing the GCD circuit outside of the pixel array may ensure that the photocurrents may be monitored regardless of the operating status of the pixel circuit.

The GCD may be configured to implement a function similar to contrast detection in a pixel circuit. The GCD may be implemented at a periphery of a pixel circuit matrix. Similar to the pixel circuits, the GCD may be configured to detect changes in light (e.g., polarity). However, the GCD may perform detections based on a summed photocurrent. The GCD may be configured to generate summation or cluster events in response to the detections of the summed photocurrents. Performing the detection based on a summed photocurrent may enable the contrast detection to be performed at a reduced current consumption compared to the pixel circuits in the pixel circuit matrix/array. Performing the detection based on a summed photocurrent may provide a lower resolution of contrast change detection compared to events generated by each of the pixel circuits. Contrast detection performances may be performed by the GCD at the periphery of the pixel matrix, which may have fewer silicon area constraints compared to the constraints in the pixel matrix. In some embodiments, the GCD may be a common/shared circuit for all of the pixel circuits and/or a common/shared circuit for a subset of pixel circuits. Sharing circuitry for the GCD for multiple pixel circuits may reduce power consumption and/or limit an area occupied by the circuitry.

Embodiments of the present disclosure may be implemented in various GCD configurations. In some embodiments, a single GCD may be implemented for the entire pixel matrix. In some embodiments, multiple GCD circuits may be implemented, with each GCD circuit assigned to a particular cluster of pixel circuits. In some embodiments, multiple GCD circuits may be implemented with each GCD circuit assigned to a particular row/column of pixel circuits. In some embodiments, a GCD may be individual for a particular cluster/row/column of pixel circuits, however some sub-circuitry of the GCD may be shared for by all of the pixel circuits. The number, type and/or arrangement of the GCD circuit(s) implemented may be varied according to the design criteria of a particular implementation.

Generally, the pixel circuits within the pixel array may be event-based pixels. Implementing the GCD circuits may enable the pixel circuits to be implemented in other types of architectures (e.g., the pixel circuits may not be limited to an event-based architecture). In an example, the pixel circuits may use more conventional topologies, such as 4T-pixels with a pinned photodiode. For example, an always-on mode may connect a transfer gate such that a photocurrent may be sensed via an anti-blooming (or equivalent) structure. An event stream may be acquired whenever the activity monitoring of the GCD shows a signature of interest, which may reduce false alarms and/or power consumption of the overall system. Generally, the GCD may be enabled during frame acquisition.

Embodiments of the present disclosure may be configured to provide summed events from the GCD circuits. The summed events may be separate events from the events in the event stream generated by the pixel matrix. The summed events may comprise ON/OFF (or POS/NEG) events based on the polarity of the contrast change detected by the GCD. In some embodiments, an implementation of the front end of the GCD may comprise a sampled system. The sampled system may enable the input to be sampled. Signal conditioning and/or filtering may be performed using a sampled switched capacitor system. In some embodiments, an implementation of the front end of the GCD may be implemented as individual circuits for each subset of pixels. Subsequent signal conditioning and/or summed event generation circuits may be shared and/or multiplexed between all or a larger subset of pixels in order to save area and power.

Embodiments of the present disclosure may be configured to operate in active (e.g., normal) and inactive (e.g., low power or standby) modes of operation of the event-based sensor. In the active mode of operation, the GCD and the digital core may be turned on and the pixel array may be turned on or off. In the active mode of operation, the digital core may be able to distinguish summation events from all pixel clusters detected by the GCD. In the inactive mode of operation, the GCD may be turned on and the digital core may be turned off and the pixel array may be turned on or off. In the inactive mode of operation, the summation events may not be distinguished between the different pixel clusters.

In one example, the event-based sensor (e.g., the digital core and/or the pixel matrix) may operate in an inactive (e.g., low power) mode of operation. For example, the readout of the pixel circuits may be disabled and/or no events may be passed to the digital core while in the low power or standby mode of operation, which may save power. The low power or standby mode of operation may be selected while the environment is generally static. The GCD circuit may be used to determine when the environment is generally static. The GCD may detect contrast changes to determine when the environment is not static. For example, the GCD may detect activity that may correspond to a cluster (or subset) of the pixels and may activate the pixel matrix and/or the digital core. Activating the pixel matrix and/or the digital core may enable a readout of the pixel circuits (e.g., the event stream) and/or enable processing of request/acknowledge signals by the digital core.

Embodiments of the present disclosure may enable a low resolution mode of operation. The GCD may enable contrast detection that represents a cluster of the pixel circuits. For example, one GCD summed event (e.g., low resolution) may be representative of multiple events that may be detected by the cluster of pixels (e.g., high resolution). Some functionality that may be used based on data from the event-based sensor may be computation intensive (e.g., stereo object tracking). Performing the computations for the particular functionality using the high resolution data may result in a high computation load. The computation load may be reduced by using the GCD summed events. The GCD summed events may provide a lower resolution of the activity/event map that represents a cluster of pixels that may be sufficient for the particular functionality. The low resolution mode using the GCD summed events may be used when the data provided is sufficient, and the processing may switch to the high resolution mode using the full pixel circuit readout events when more precise data is beneficial for the particular type of functionality.

The GCD summed events may operate based on dynamically programmable reference thresholds. The reference thresholds may indicate a minimum and maximum contrast for counting one of the GCD summed events. For example, when the GCD summed event passes a particular threshold, the references may be widened to detect a maximum contrast. When the GCD event count is lower than a set value, the references may be tightened to be able to detect a minimum contrast. Similarly, for a frame-based camera, the summed events detected by the GCD may be used to activate the frame-based camera. For example, the frame base camera may be activated only when GCD events are detected (e.g., may be defined for all of the sensor array or smaller subsets of pixels). The particular circumstances detected for adjusting from a low resolution mode of operation to a high resolution mode of operation may be varied according to the design criteria of a particular implementation.

Embodiments of the present disclosure may be configured to provide an additional layer of signal conditioning/filtering. In one example, a stopband may be added around 60 Hz for filtering. In another example, a high pass filter may be used to provide filtering. For example, when a localized average current lies in an undesired bandwidth, the GCD may reject the current (e.g., not create summation events), which may result in the readout from the corresponding pixels to be rejected (e.g., prevented from activating the pixel circuits). Reducing the number of events generated by the pixel circuits may reduce data output, which may be particularly useful for undesired signals, such as flicker events. By filtering right at the pixel level (e.g., not at the digital/firmware level), an amount of data sent to the digital core may be reduced. The GCD circuit may be used to extract an average flicker frequency of a scene. The average flicker frequency may be used to automatically adjust an anti-flicker (AFK) technique.

Referring to FIG. 1, a block diagram illustrating an example embodiment of the present disclosure is shown. An apparatus 100 may be configured to implement global and cluster contrast detection in vision neuromorphic sensors. In some embodiments, the apparatus 100 may be implemented in a handheld camera that may be operated by a person.

Photoreceptors 40 may comprise photodiodes 50a-50n that generate a photocurrent signal IPHOTO[0-N] in response to a light input LIN.

A pixel array (or matrix) 52 includes pixel circuits (or pixels) 60a-60n and generates an event stream EVSTM and a summation of currents IPSUM[0-M] in response to the photocurrent signal IPHOTO[0-N]. The event stream EVSTM may be presented to a digital core 56. The summation of photocurrents IPSUM[0-M] is presented to current mirrors 102a-102m.

Details of the components of the pixels 60a-60n will be described in association with FIG. 10. The number, shape and/or arrangement of the pixels 60a-60n of the pixel array 52 may be varied according to the design criteria of a particular implementation.

Each of the pixels 60a-60n may be configured to logarithmically translate a respective one of the photocurrent signals IPHOTO[0-N] to a pixel internal voltage signal. The voltage signal is monitored for deviations from a previously stored voltage level exceeding one or more thresholds. The detection of the voltage signal crossing the threshold results in a generation of one of the events. After one of the pixels 60a-60n generates one of the events, the pixel that generated the event resets to the current light level and continues monitoring for new deviations exceeding the threshold(s). In an example, the pixels 60a-60n may operate similar to an amplitude-domain level-crossing sampler with respect to the photoreceptor voltage signal (or an asynchronous delta modulator (ADM) operation). The photocurrents IPHOTO [0-N] continuously change with the light impinging on the photodiodes 50a-50n and the changes to the light are detected by the pixels 60a-60n to generate the events.

The pixels 60a-60n are grouped into clusters of pixels. Each of the clusters of pixels comprises a subset of the total number of the pixels 60a-60n implemented. Details of the clusters of the pixels 60a-60n will be described in association with FIGS. 2-4. One or more of the summations of photocurrents IPSUM[0-M] may correspond to a cluster of the pixels 60a-60n. The summation of the photocurrents IPSUM[0-M] may comprise a combination of the photocurrents received in the photocurrent signal IPHOTO[0-N] at a particular time. In an example, the summation of photocurrents IPSUM[0-M] may comprise fewer components (e.g., m) than the total number of photocurrents in the signal IPHOTO[0-N] (e.g., n).

The event stream EVSTM comprises a number of events generated by any of the pixels 60a-60n. Generally, each of the pixels 60a-60n may be configured to communicate the events. In some embodiments, the events generated by the pixel array 52 are serialized after the output from the pixels 60a-60n to generate the event stream EVSTM.

The event stream EVSTM includes the asynchronous events triggered in response to contrast changes detected by the pixel array 52. Each of the pixels 60a-60n may detect (or respond to) a local contrast change in the light input. Since the events are generated asynchronously, the event stream EVSTM provides the positive or negative events in response to the local contrast changes without producing an entire frame at a pre-determined rate. The asynchronous generation of the events enables the event stream EVSTM to provide the change in the light input (e.g., as a positive event or a negative event) at the pixels 60a-60n without redundant temporal or spatial sampling.

The digital core 56 may be configured to perform one or more digital operations on the event stream EVSTM and/or the summation events. For example, the digital core 56 may implement a digital processing block 70 to perform the various digital operations.

Each of the current mirrors 102a-102m receives one of the m summed photocurrents IPSUM[0-M]. The photocurrents IPHOTO[0-N] may be summed into m clusters and then sent to the current mirrors 102a-102m. The current mirrors 102a-102m may be configured to copy and/or divide the received current by a particular factor, for instance divide by a factor of ten to reduce power consumption. The current mirrors 102a-102m generate a signal IPCOPY[0-M] including a copy of the m summed currents IPSUM[0-M]. Details of the current mirrors 102a-102m will be described in association with FIG. 11. The copied photocurrents IPCOPY [0-M] are presented to the GCD array 104.

The GCD array 104 comprises a number of circuits 110a-110m that each implements a Global Contrast Detector (GCD). In some embodiments, a single GCD (e.g., the GCD 110) may be implemented. In some embodiments, one GCD circuit may be implemented for each one of the clusters of the pixel circuits 60a-60n. Each of the GCD circuits 110a-110m may be associated with a number (e.g., more than one) of the pixel circuits 60a-60n. Since each of the GCD circuits 110a-110m may correspond to multiple (e.g., a cluster) of the pixel circuits 60a-60n, the GCD array 104 may comprise fewer GCD circuits 110a-110m than the number of the pixel circuits 60a-60n implemented by the pixel array 52. In an example, the number of GCD circuits 110a-110m implemented may be the same as the number of components of the summed photocurrents IPSUM[0-M] and/or the number of current mirrors 102a-102m. Each of the GCD circuits 110a-110m receives a component of the copied photocurrents IPCOPY[0-M]. The GCD array 104 may operate outside of the pixel array 52.

Each of the GCD circuits 110a-110m may be configured to provide information on the global activity and/or illumination of the pixel array 52 and/or a subset of the pixels 60a-60n. The copied photocurrents IPCOPY[0-M] may comprise the sum of the photocurrents IPHOTO[0-N] provided to the pixel circuits 60a-60n. A front-end (or photoreceptor block) of the GCD circuits 110a-110m may be configured to convert the copied photocurrents IPCOPY[0-M] to a logarithmic voltage. The GCD circuits 110a-110m may be configured to perform measurements of the summation of the photocurrents. In one example, the GCD circuits 110a-110m may perform an absolute measurement of the summation of the photocurrents. In another example, the GCD circuits 110a-110m may perform relative measurements of the summation of the photocurrents. Each of the GCD circuits 110a-110m may be configured to generate a summation event in response to the measurements.

The GCD circuits 110a-110m may each be configured to generate the summation events. The summation events may be similar to the events generated by the pixel array 52. However, the summation events may provide a lower resolution of the changes in contrast than the resolution provided in the event stream EVSTM. The summation events may be configured to represent a change in contrast for the entire pixel array 52 and/or for a cluster of the pixels 60a-60n. The summation events may comprise positive events (e.g., ON or POS events) or negative events (e.g., OFF or NEG events). For example, the positive summation events may indicate an increase in contrast and/or illumination and the negative summation events may indicate a decrease in contrast and/or illumination.

The GCD array 104 may be configured to generate a signal (e.g., ACTIVATE), a signal (e.g., POS) and/or a signal (e.g., NEG). The GCD array 104 may be configured to receive a signal (e.g., ACKB) and/or a signal (e.g., RST). The signal ACTIVATE may be an activation signal. The signal POS may be a positive summation event. The signal NEG may be a negative summation event. The signal ACKB may be an acknowledge signal. The signal RST may be a reset signal. The number, type and/or function of each of the signals sent/received by the GCD array 104 may be varied according to the design criteria of a particular implementation.

The signal ACTIVATE may be presented to the digital core 56. The signal ACTIVATE may be configured to select and/or toggle a mode of operation for the digital core 56. The digital core 56 may operate in at least an active mode (e.g., normal mode, fully functional mode, default mode, etc.) of operation and an inactive mode (standby mode, ultra-low powered mode, powered down mode, sleep mode, etc.) of operation. In the inactive mode of operation, the digital core 56 may be off. In the inactive mode of operation, the digital core 56 may provide power savings. The signal ACTIVATE may be configured to select the active mode of operation for the digital core 56. In the active mode of operation, the digital core 56 may be configured to perform various operations. In an example, the digital core 56 may be fully functional in the active mode of operation and (e.g., the digital processing block 70) may process the event stream EVSTM, the summation events and/or perform other operations.

The signal ACTIVATE may not necessarily directly affect whether the pixel array 52 is activated or inactivated. For example, the pixel array 52 may be activated and/or inactivated independently from the activation and/or inactivation of the digital core 56. In some embodiments, the signal ACTIVATE may be configured to activate the digital core 56 and the digital core 56 may in turn, activate components of an analog core of the apparatus 100 (e.g., the pixel array 52, bias circuits, ADCs, PMU, temperature sensor(s), other analog units, etc.). For example, the signal ACTIVATE may be used to activate the digital core 56 and/or enable an activation of components of the analog core of the apparatus 100. Which components may be activated and/or inactivated in response to the signal ACTIVATE may be varied according to the design criteria of a particular implementation.

The signal POS and the signal NEG may be presented to the digital core 56. In some embodiments, the signal POS and/or the signal NEG may be used internally by the GCD circuits 110a-110m in order to generate the signal ACTIVATE. In an example, the signal ACTIVATE may be generated in response to a logical OR operation of positive summation events and negative summation events. The signal POS may present the positive summation events to the digital core 56. The signal NEG may present the negative summation events to the digital core 56. In some embodiments, a single signal POS may provide information about the positive summation events for all of the GCD circuits 110a-110m and a single signal NEG may provide information about the negative summation events for all of the GCD circuits 110a-110m. In some embodiments, the signal POS may comprise a component (e.g., up to m components) for each of the positive summation events provided by each of the GCD circuits 110a-110m and the signal NEG may comprise a component (e.g., up to m components) for each of the negative summation events provided by each of the GCD circuits 110a-110m.

The summation events (e.g., the signal POS or the signal NEG) may be similar to the events in the event stream EVSTM. The summation events may comprise positive summation events and negative summation events generated by the GCD circuits 110a-110m. The events may comprise positive events and negative events generated by the pixel circuits 60a-60n. Generally, the events generated by the pixel circuits 60a-60n may have a higher level of granularity (e.g., resolution) than the summation events generated by the GCD circuits 110a-110m. For example, the positive events and negative events may correspond to each of the pixel circuits 60a-60n and the positive summation events and the negative summation events may correspond to a cluster of the pixel circuits 60a-60n (or the entire pixel array 52).

The acknowledge signal ACKB may be generated by the digital core 56. The digital core 56 may generate the acknowledge signal ACKB in response to either a positive summation event or a negative summation event. The acknowledge signal ACKB may provide an acknowledgment that the summation event(s) have been received.

The reset signal RST may be generated by the digital core 56. In some embodiments, the reset signal RST may be generated and used internally by the GCD circuits 110a-110m. For example, when the digital core 56 is in a low powered mode of operation, the signal RST may be generated internally by the GCD circuits 110a-110m. The signal RST may be configured to remove a request by the GCD circuits 110a-110m after the request has been acknowledged and/or remove a request that has already been acknowledged. The signal RST may prepare the GCD circuits 110a-110n for the generation of subsequent summation events. In some embodiments, the signal RST may reset all the GCD circuits 110a-110m after receiving the acknowledgment for a single request. In some embodiments, the signal RST may reset a subset of the GCD circuits 110a-110m and/or a sub-circuit that has had a request acknowledged.

The GCD circuits 110a-110m may operate as a standalone device and/or in parallel with the pixel array 52. As a standalone device, the GCD circuits 110a-110m may provide a first layer of contrast detection. The GCD circuits 110a-110m may detect contrast changes while the pixel matrix 52 is disabled. For example, the pixel circuits 60a-60n may be powered down to not generate the events and the photocurrents IPHOTO[0-N] may bypass the event stream generation and be summed for the summation currents IPSUM[0-M]. When the pixel array 52 is disabled, the GCD circuits 110a-110m may detect the contrast changes (e.g., provide the summation events). In response to the summation events, the pixel array 52 may be activated (e.g., in response to a bypass signal being de-asserted by either the GCD array 104 or the digital core 56).

While the GCD circuits 110a-110m operate in the standalone mode of operation, the digital core 56 may be disabled in the inactive mode or may be functional in the active mode of operation (e.g., the activation of the digital core 56 may be independent of the activation of the pixel array 52). When the digital core 56 is in the low-powered limited functionality configuration, the GCD array 104 may de-assert a bypass signal and thus control whether the pixel circuits 60a-60n generate the events for the event stream EVSTM. In one example, the bypass signal generated by the GCD array 104 may comprise a default value that may be a static value. In another example, the bypass signal generated by the GCD array 104 may comprise a default value that may be driven by a pad (e.g., a padring) of the apparatus 100. A control unit may be implemented that configures all the clusters of the pixels 60a-60n and sends the enable signals in response to the de-assertion of the bypass signal from the GCD array 104. The control unit may de-assert a bypass signal to the pixel array 52 while the digital core 56 is in the inactive mode of operation.

In some embodiments, a signal (e.g., ULP_EN, not shown) may be received by the GCD array 104 (e.g., an input from a padring) that may be configured to define the mode of operation of the digital core 56. For example, the signal ULP_EN may indicate when the digital core 56 is in the low power mode of operation. In an example, when the signal ULP_EN is asserted (e.g., the digital core 56 is in the low power mode of operation), the GCD circuits 110a-110m may take over the control of the bypass of the pixel array 52 (e.g., and other analog blocks). When the signal ULP_EN is not asserted (e.g., the digital core 56 is in the normal mode of operation), the digital core 56 may define various control signals (e.g., the signal BYPASS and/or other control signals). In one example, the digital core 56 may start by default in the low power mode and the digital core 56 may be activated in response to the signal ACTIVATE and/or when the signal ULP_EN is asserted.

When the digital core 56 is in the inactive (or low power) mode of operation, the digital core 56 and most of an analog core of the apparatus 100 may be off. The GCD circuits 110a-110m may operate as standalone devices that may detect contrast changes in order to generate the signal ACTIVATE. The signal ACTIVATE may enable the digital core 56 (e.g., change to the normal mode of operation) and the rest of the analog core of the apparatus 100 (e.g., which may include the pixel circuits 60a-60n). When the digital core 56 is in the low power mode, the GCD circuits 110a-110m may operate as a global GCD (e.g., the summation events may correspond to all of the pixel circuits 60a-60n) and present the single signal ACTIVATE to the digital core 56. Generally, the standalone functionality of the GCD circuits 110a-110m may enable significant power savings compared to when the digital core 56 is active. When the digital core 56 is in the low power mode of operation, the apparatus 100 may be configured to provide an ultra-low power sensor (e.g., the apparatus 100 may run on a battery). The GCDs 110a-110m may enable the apparatus 100 to operate such that the digital core 56 and analog core (including the pixels 60a-60n) are generally off and then turned on when activity is detected in the scene.

When the digital core 56 is in the active mode of operation, the digital core 56 may toggle the state of a signal (e.g., BYPASS and/or SMART ACTIVATE) in response to contrast changes detected in the summation events. For example, the GCD array 104 may assert the signal ACTIVATE to enable the digital core 56 and the digital core 56 may determine whether to toggle the signal BYPASS to bypass the pixels circuits 60a-60n or not. For example, when the digital core 56 is in the normal mode of operation, the pixel array 52 may be bypassed or may be active (e.g., based on a determination made by the digital core 56). The signal SMART ACTIVATE may be an activation signal.

While the GCD circuits 110a-110m operate in the parallel mode of operation with the pixel array 52, the digital core 56 may be in the active mode of operation. The information (i.e., the summation events) from the GCD circuits 110a-110m may be used in conjunction with the event stream data from the pixel array 52. When the digital core 56 is active, the GCDs 110a-110m may provide the summation events on a per cluster basis. The digital core 56 may distinguish the summation events per cluster, or cluster events (e.g., to enable a better understanding of where the contrast changes have been detected). The summation events may be used by the digital processing block 70 to perform flicker mitigation or other types of data processing for the event stream EVSTM. In one example, the summation events may be used by the digital core 56 to perform flicker detection/mitigation for the event stream EVSTM. In another example, the summation events may be used by the digital core 56 to determine a light pattern/form, a duty cycle, a frequency, false summation event rejection, etc. In yet another example, the summation events may be used by the digital core 56 to detect specific (e.g., predefined) light patterns. In still another example, the digital core 56 may be configured to filter the raw summation events in order to correct and/or calibrate false events in the event stream EVSTM. In another example, the digital core 56 may be configured to analyze the raw summation events to toggle the signal BYPASS, adjust a wakeup criteria for the pixel array 52 and/or generate the signal SMART ACTIVATE depending on the desired application. The functions performed by the digital core 56 and/or the digital processing block 70 in response to the summation events and/or the event stream EVSTM may be varied according to the design criteria of a particular implementation.

The signal SMART ACTIVATE may be configured to activate another component of the apparatus 100 (not shown). For example, the other components may comprise an HDMI interface, Wi-Fi, Ethernet, audio, etc. In some embodiments, the signal SMART ACTIVATE may operate similar to the signal ACTIVATE. For example, the signal SMART ACTIVATE may toggle functionality of various other components other than the digital core 56. In some embodiments, the signal SMART ACTIVATE may be an output resulting from the post-processing performed by the digital core 56. In an example, the signal SMART ACTIVATE may indicate that the scene may be free of false events/flicker events and/or indicate a detected flicker frequency. In some embodiments, the signal SMART ACTIVATE may be used to turn on the pixel circuits 60a-60n (e.g., turn off the pixel bypass).

Generally, the activation of the digital core 56 may be independent from the activation of the pixel array 52. In an example, the pixel array 52 may be active while the digital core 56 is inactive or active. Similarly, the digital core 56 may be active while the pixel array 52 is inactive or active. The GCD circuits 110a-110m may be configured to enable and/or disable the pixel array 52. The GCD circuits 110a-110m may be configured to enable and/or disable the digital core 56.

Figures 2, 3, 4:
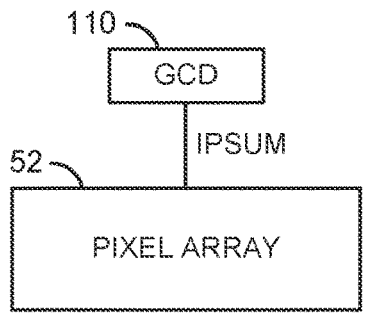
FIG. 2 is a diagram illustrating implementing a global contrast detector circuit configured to operate on an entire pixel array.
FIG. 3 is a diagram illustrating implementing multiple global contrast detector circuits configured to operate on clusters of pixel circuits.
FIG. 4 is a diagram illustrating multiple global contrast detector circuits configured to operate on rows of pixel circuits.

Referring to FIG. 2, a diagram illustrating implementing a global contrast detector circuit configured to operate on an entire pixel array is shown. Various embodiments of the apparatus 100 may implement different configurations for the GCDs 110a-110m. A simplified version of the pixel array 52 and the GCD circuit 110 is shown for illustrative purposes.

In the configuration shown, the GCD array 104 may comprise a single GCD circuit 110. The single GCD circuit 110 embodiment may comprise the GCD circuit 110 configured to provide the contrast detection for the entire pixel array 52. For example, cluster of pixels circuits 60a-60n associated with the single GCD circuit 110 may comprise all of the pixel circuits 60a-60n.

The pixel array 52 may generate the summation photocurrent IPSUM comprising a summation of all of the photocurrents generated by the photodiodes 50a-50n. For the single GCD 110 implementation, the signal IPSUM may comprise a summation of the all of the photocurrents IPHOTO[0-N]. The single GCD 110 may be configured to determine contrast changes corresponding to the entire pixel array 52. The summation events generated by the single GCD 110 may correspond to contrast changes and/or changes in illumination of an entire scene captured by the camera implementing the apparatus 100. The positive summation events in the signal POS and/or the negative summation events in the signal NEG may provide only a high-level of information about changes in a scene. In an example, when the digital core 56 is in the low power mode of operation, the summation events may not be distinguishable between each of the clusters of the pixels 60a-60n. When the digital core 56 is in the low power mode of operation, the summation events may correspond to all of the pixels 60a-60n of the pixel array 52.

Referring to FIG. 3, a diagram illustrating implementing multiple global contrast detector circuits configured to operate on clusters of pixel circuits is shown. A simplified version of the pixel array 52 and the GCD circuits 110a-110m is shown for illustrative purposes. Pixel clusters 120a-120l are shown.

The pixel clusters 120a-120l may comprise groups of the pixel circuits 60a-60n. In the example shown, the pixel clusters 120a-120l may comprise a 3×4 array of groups of the pixel circuits 60a-60n. The arrangement of the pixel clusters 120a-120l is shown for illustrative purposes. A cluster of the pixel circuits 60a-60n may represent a given number of columns and rows. The pixel clusters 120a-120l may each provide information about a region of the scene. The number of pixel circuits 60a-60n in each of the pixel clusters 120a-120l and/or the particular pixel circuits 60a-60n in each of the pixel clusters 120a-120l may be varied according to the design criteria of a particular implementation.

The GCD circuits 110a-110m are shown associated with the pixel clusters 120a-120l. In some embodiments, one of the GCDs 110a-110m may correspond to one of the pixel clusters 120a-120l (e.g., 1 GCD per pixel cluster with the pixel array 52 implementing the pixel clusters 120a-120m to correspond with the GCD circuits 110a-110m). In some embodiments, one or more of the GCD circuits 110a-110m may be associated with multiple of the pixel clusters 120a-120l. In an example, the GCD 110a may be configured to detect contrast changes in a column of the pixel clusters comprising the pixel cluster 120a, the pixel cluster 120e and the pixel cluster 120i and the GCD 110e may be configured to detect contrast changes in a row of the pixel clusters comprising the pixel cluster 120a, the pixel cluster 120b, the pixel cluster 120c and the pixel cluster 120d.

In some embodiments, one of the pixel clusters 120a-120l may be associated with only one of the GCD circuits 110a-110m (e.g., the GCD circuit 110a may detect changes in the pixel cluster 120a and none of the other GCD circuits 110b-110m may detect changes in the pixel cluster 120a). In some embodiments, multiple of the GCD circuits 110a-110m may be associated with the same one of the pixel clusters 120a-120l. For example, by associating the same pixel clusters 120a-120l with multiple of the GCD circuits 110a-110m, the GCD circuits 110a-110m may be configured to detect changes in particular patterns and/or shapes of regions (e.g., one GCD detects changes in a top right corner, another GCD detects changes in the right side of the scene and another GCD detects changes along the top of the scene, where the top right corner, the right side and the top of the scene may all comprise the pixel cluster 120d).

Sensing changes differences within one of the pixel clusters 120a-120l or among adjacent pixel clusters may provide a greater granularity of details about the evolution of light changes in a particular scene. In an example, when the digital core 56 is in the normal mode of operation, the summation events may be distinguishable between each of the clusters 120a-120l of the pixels 60a-60n. When the digital core 56 is in the normal mode of operation, each of the summation events may correspond to one of the clusters 120a-120l of said pixel circuits 60a-60n. Which of the GCD circuits 110a-110m is associated with which of the pixel clusters 120a-120l may be varied according to the design criteria of a particular implementation.

Referring to FIG. 4, a diagram illustrating multiple global contrast detector circuits configured to operate on rows of pixel circuits is shown. A simplified version of the pixel array 52 and the GCD circuits 110a-110m is shown for illustrative purposes. Pixel clusters 120a'-120i' and the GCD circuits 110a-110i are shown.

In the example shown, the pixel clusters 120a'-120i' may correspond to each row of the pixel circuits 60a-60n in the pixel array 52. In another example, the pixel clusters 120a'-120i' may correspond to each column of the pixel circuits 60a-60n. The GCD circuits 110a-110i may be configured to detect contrast changes and generate the summation events for each of the rows represented by the pixel clusters 120a'-120i'. By associating one of the GCD circuits 110a-110m with each pixel row or pixel column, the GCD circuits 110a-110m may provide the summation events per pixel row or per pixel column. Generally, variations of contrast changes within rows (or columns) or between adjacent rows (or between adjacent columns) may provide important details about the evolution of a scene.

Referring to FIG. 5, a block diagram illustrating components of GCD circuits implementing relative illuminance sensors configured to generate summation events for each cluster of pixels is shown. An implementation 150 comprising the GCD array 104 and the pixel clusters 120a-120m is shown. The summed photocurrents IPSUM copied from the pixel clusters 120a-120m as the copied photocurrents IPCOPY may be presented to the GCD array 104. The GCD array 104 may comprise multiple of the GCD circuits 110a-110m implemented as relative illuminance sensors. In one example, nine of the pixel clusters 120a-120m may be implemented and the GCD array 104 may comprise nine of the GCD circuits 110a-110m. The number of pixel clusters 120a-120m and/or GCD circuits 110a-110m implemented may be varied according to the design criteria of a particular implementation.

The components of the GCD circuits 110a-110m are shown. The GCD circuits 110a-110m may each comprise one of the corresponding blocks (or circuits) 152a-152m, one of the corresponding blocks (or circuits) 154a-154m, one of the corresponding blocks (or circuits) 156a-156m and/or one of the corresponding blocks (or circuits) 158a-158m. The GCD array 104 may further comprise a block (or circuit) 160 and/or a block (or circuit) 162. The circuits 152a-152m may comprise GCD front-ends. The circuits 154a-154m may comprise GCD low-pass filters. The circuits 156a-156m may comprise GCD high-pass filters and gain stages. The circuits 158a-158m may comprise GCD comparators. The circuit 160 may comprise a logic gate. The circuit 162 may comprise a GCD handshake logic circuit. The individual GCD circuits 110a-110m and/or the GCD array 104 may comprise other components (not shown). The number, type and/or arrangement of the components of the GCD circuits 110a-110m and/or the GCD array 104 may be varied according to the design criteria of a particular implementation.

The GCD front end circuits 152a-152m may be configured to receive the signal IPCOPY from the current mirrors 102a-102m. The GCD front end circuits 152a-152m may each be configured to generate a voltage GCD_PR_OUT. In some embodiments, the digital core 56 may be configured to program the GCD front end circuits 152a-152m in order to change a biasing, a bandwidth and/or shape a noise response. The voltage GCD_PR_OUT from each of the GCD front end circuits 152a-152m may be presented to the respective one of the GCD low-pass filters 154a-154m. Details of the GCD front end circuits 152a-152m may be described in association with FIG. 11 and/or FIG. 13.

Each of the GCD low-pass filters 154a-154m may be configured to receive the signal GCD_PR_OUT from the respective GCD front end circuits 152a-152m. The GCD low-pass filters 154a-154m may be configured to perform a low-pass filter of the signal GCD_PR_OUT and provide a buffer circuit. In some embodiments, the digital core 56 may be configured to program a bandwidth of the low-pass filters 154a-154m. The GCD low-pass filters 154a-154m may be configured to generate a signal (e.g., GCD_LPF_OUT). The signal GCD_LPF_OUT generated by each of the GCD low-pass filters 154a-154m may be presented to a respective one of the GCD high-pass filter and gain stages 156a-156m.

Each of the GCD high-pass filter and gain stages 156a-156m may be configured to receive the signal GCD_LPF_OUT from the respective GCD low-pass filters

154*a*-154*m*. The GCD high-pass filter and gain stages 156*a*-156*m* may comprise a programmable gain control and/or a tunable high-pass filter. In some embodiments, the digital core 56 may be configured to program the gain control and/or tune the high-pass filter for the GCD high-pass filter and gain stages 156*a*-156*m*. The digital core 56 may be further configured to program a reference voltage to the amplifier of the gain stages. In an example, the gain of the gain stage circuit may be programmed dynamically by the digital core 56 in conjunction with comparator references (e.g., implemented by the GCD comparators 158*a*-158*m*) in order to adjust a contrast threshold depending on the scene and/or application constraints/preferences.

The GCD high-pass filter and gain stages 156*a*-156*m* may be configured to perform a gain operation and high-pass filter the amplified signal. The GCD high-pass filter and gain stages 156*a*-156*m* may be configured to receive the reset signal RST. The reset signal RST may be received after a summation event has been generated and acknowledged in order to prepare the GCD circuits 110*a*-110*m* for the generation of subsequent summation events. The GCD high-pass filter and gain stages 156*a*-156*m* may each be configured to generate a signal (e.g., GCD_DIFF_OUT). The signal GCD_DIFF_OUT generated by each of the high-pass filter and gain stages 156*a*-156*m* may be presented to a respective one of the GCD comparators 158*a*-158*m*.

Each of the GCD comparators 158*a*-158*m* may be configured to receive the signal GCD_DIFF_OUT from the respective GCD high-pass filter and gain stages 156*a*-156*m*. Each of the GCD comparators 158*a*-158*m* may implement a pair of comparators. The GCD comparators 158*a*-158*m* may comprise a positive (or on) comparator and a negative (or off) comparator. The pair of comparators may be configured to generate the positive summation events (e.g., the signal POS) or the negative summation events (e.g., the signal NEG).

The GCD comparators 158*a*-158*m* may comprise at least two comparators. One of the comparators may be configured to compare the signal GCD_DIFF_OUT to a positive reference voltage to determine whether to generate the positive summation event (e.g., GCD_DIFF_OUT>VREF_POS). Another of the comparators may be configured to compare the signal GCD_DIFF_OUT to a negative reference voltage to determine whether to generate the negative summation event (e.g., GCD_DIFF_OUT<VREF_NEG). The positive reference voltage may be a higher value than the negative reference voltage. No summation event may be generated when the signal GCD_DIFF_OUT is in between the positive reference voltage and the negative reference voltage (e.g., no significant change in contrast has occurred).

The digital core 56 may be configured to program the voltage levels for the positive reference voltage and the negative reference voltage. The digital core 56 may be configured to dynamically change the reference voltages of the pair of comparators depending on the scene and/or a desired contrast threshold. Details of the reference voltages may be described in association with FIG. 16. The signal POS and/or the signal NEG generated by each of the GCD comparators 158*a*-158*m* may be presented to the logic gate 160.

The logic gate 160 may be configured to receive the signal POS and/or the signal NEG from each of the GCD comparators 158*a*-158*m*. In the example shown, the logic gate 160 may be configured to perform a logical OR operation. In an example, the logic gate 160 may comprise flip flops to ensure that short summation events are captured. In the example shown, the output of the logic gate 160 may be presented to the GCD handshake logic 162.

The GCD handshake logic 162 may be configured to receive the output from the logic gate 160. The GCD handshake logic 162 may be configured to enable communication between the GCD circuits 110*a*-110*m* in the GCD array 104 and the digital core 56. The GCD handshake logic 162 may be configured to generate the signal ACTIVATE in response to the output of the logic gate 160. The logical OR operation of the positive summation event and/or the negative summation event may be implemented to generate the signal ACTIVATE. The GCD handshake logic 162 may be configured to receive the acknowledge signal ACKB from the digital core 56. The GCD handshake logic may be configured to generate the reset signal RST in response to the acknowledge signal ACKB. The signal RST may be presented to the GCD high-pass and gain stages 156*a*-156*m*. In some embodiments, the signal RST may be presented to a logic unit in order to reset the D flip flops that may be implemented to present the summation events. In the example of the implementation 150 (e.g., with the digital core 56 operating in the low power mode of operation), the reset signal RST may be an internal signal used by the GCD circuits 110*a*-110*m*.

The implementation 150 of the GCD array 104 may be configured as Relative Illuminance Sensors (RIS). The RIS implementation 150 may merge the summation events into a single signal (e.g., the activation signal ACTIVATE). The RIS implementation 150 may be configured to convert the photocurrent sum (e.g., the signal IPSUM copied as the signal IPCOPY) into a voltage. The voltage may be compared to a reference value (e.g., the signal VREF_POS and the signal VREF_NEG) to generate the positive summation events and/or the negative summation events. In some embodiments, the GCD array 104 may be configured to implement both relative illuminance sensors and absolute illuminance sensors. Details of the absolute illuminance sensors may be described in association with FIGS. 8-9.

In the RIS implementation 150, the digital core 56 may be in the inactive mode of operation. Since the digital core 56 is in the inactive mode of operation, the apparatus 100 may not be able to make a distinction between contrast changes in the various pixel clusters 120*a*-120*m*. The pixel array 52 may be disabled or enabled. The signal ACTIVATE may be a logical OR of the positive and negative summation events presented to the digital core 56 (not shown). The digital core 56 may be activated in response to the signal ACTIVATE. Similarly, a de-assertion of the bypass signal by the GCDs 110*a*-110*m* to enable the pixel array 52 may be a logical OR of the positive and negative summation events.

Referring to FIG. 6, a block diagram illustrating components of GCD circuits implementing relative illuminance sensors with a simplified front-end to generate a single summation event for all clusters of pixels is shown. A simplified RIS implementation 170 comprising the GCD array 104 and the pixel clusters 120*a*-120*m* is shown. The summed photocurrents IPSUM copied from the pixel clusters 120*a*-120*m* may be presented to the GCD array 104. The simplified RIS implementation 170 may be similar to the implementation 150 shown in association with FIG. 5.

In the simplified RIS implementation 170, the GCD circuits 110*a*-110*m* may comprise the GCD front end circuits 152*a*-152*m*, the GCD low-pass filters 154*a*-154*m*, the logic gate 160 and the GCD handshake logic 162. In the simplified RIS implementation 170, the digital core 56 may be disabled (e.g., in the inactive mode of operation) and the pixel array 52 may be disabled or enabled. Similar to the implementation 150 shown in association with FIG. 5, the simplified RIS implementation 170 may merge the summation events into the single activation signal ACTIVATE. With the digital core 56 in the inactive mode of operation, the apparatus 100 may not be able to make a distinction between illuminance changes in the different pixel clusters 120a-120m.

Compared to the implementation 150, the simplified RIS implementation 170 may have a front-end design with less circuitry. For example, the simplified RIS implementation 170 may have a lower cost of implementation and/or may consume less power. (e.g., the simplified RIS implementation 170 may be area and power efficient). The GCD circuits 110a-110m in the simplified RIS implementation 170 may share a single GCD high-pass filter and gain stage 156 and a single GCD comparator 158. The single GCD high-pass filter and gain stage 156 and the single GCD comparator 158 may be used for the photocurrents received from all of the pixel clusters 120a-120m.

In the simplified RIS implementation 170, the signal GCD_LPF_OUT from the GCD low-pass filters 154a-154m GCD may be merged (e.g., time multiplexed) in the single GCD high-pass filter and gain stage 156. The single GCD high-pass filter and gain stage 156 may perform the amplification and high-pass filtering in response to the time multiplexed signal GCD_LPF_OUT and generate the signal GCD_DIFF_OUT. In an example, since the single GCD high-pass filter and gain stage 156 may correspond to multiple of the pixel clusters 120a-120m, output from the GCD front-end circuits 152a-152m may be time multiplexed and sampled. The output of the single GCD high-pass filter and gain stage 156 may correspond to a particular cluster/row at a particular sampled time. The signal GCD_LPF_OUT may be output by each of the GCD low-pass filters 154a-154m and connected to an input of the single GCD high-pass filter and gain stage 156 sequentially in response to time multiplexing.

The signal GCD_DIFF_OUT may be presented to the single GCD comparator 158. The single GCD comparator 158 may implement a pair of comparators (e.g., instead of the m pairs of comparators implemented by the GCD comparators 158a-158m described in association with FIG. 5). The pair of comparators of the single GCD comparator 158 may compare the signal GCD_DIFF_OUT to the positive reference voltage and the negative reference voltage to generate a single positive summation event or a single negative summation event. The logic gate 160 and the GCD handshake logic 162 may use the summation event to generate the activation signal ACTIVATE in order to change the mode of operation of the digital core 56 (e.g., activate the digital core 56).

Referring to FIG. 7, a block diagram illustrating components of GCD circuits implementing relative illuminance sensors configured to provide summation events to an activated digital core is shown. An activated RIS implementation 180 comprising the digital core 56, the GCD array 104 and the pixel clusters 120a-120m is shown. The summed photocurrents IPSUM copied from the pixel clusters 120a-120m may be presented to the GCD array 104. The activated RIS implementation 180 may be similar to the implementation 150 shown in association with FIG. 5.

In the activated RIS implementation 180, the GCD circuits 110a-110m may comprise the GCD front end circuits 152a-152m, the GCD low-pass filters 154a-154m, the GCD high-pass filter and gain stages 156a-156m, and the GCD comparators 158a-158m (the logic gate 160 and the GCD handshake logic 162 may be implemented, but not shown for illustrative purposes). In the activated RIS implementation 180, the digital core 56 may be activated (e.g., in the normal mode of operation) and the pixel array 52 may be disabled or enabled. In some embodiments, the GCDs 110a-110m may comprise the simplified RIS implementation 170 shown in association with FIG. 6 (e.g., having the single GCD high-pass filter and gain stage 156 and the single GCD comparator 158) with the digital core 56 in the activated mode of operation. With the digital core 56 in the activated mode of operation, the apparatus 100 may be able to make a distinction between illuminance changes in each of the different pixel clusters 120a-120m. In an example, the GCD circuits 110a-110m in the activated RIS implementation 180 may be configured to provide all positive summation events and all negative summation events corresponding to all of the pixel clusters 120a-120m (e.g., based on the summed photocurrents IPSUM[0-M]).

In the activated RIS implementation 180, the GCD front end circuits 152a-152m, the GCD low-pass filters 154a-154m, the GCD high-pass filter and gain stages 156a-156m and the GCD comparators 158a-158m may operate similar to the implementation 150 described in association with FIG. 5. With the digital core 56 activated, the GCD comparators 158a-158m may present the summation events to the digital core 56. The signals POS[0-M] and/or the signals NEG[0-M] may be presented to the digital core 56.

The digital core 56 may comprise a block (or circuit) 182 and/or a block (or circuit) 184. The circuit 182 may implement GCD logic. The circuit 184 may implement a processor. The digital core 56 may comprise other components (not shown). The number, type and/or arrangement of the components of the digital core 56 may be varied according to the design criteria of a particular implementation.

The GCD logic 182 may provide an interface between the GCDs 110a-110m and the digital core 56. The GCD logic 182 may be configured to receive the positive summation event signals POS[0-M] and the negative summation event signals NEG[0-M]. The GCD logic 182 may be configured to generate the signal RST. In the activated RIS implementation 180, the signal RST may be provided by the digital core 56.

The GCD logic 182 may be configured to analyze the summation events generated by each of the GCDs 110a-110m. The analysis may be used to generate statistical information about illuminance changes detected for each of the pixel clusters 120a-120m. The GCD logic 182 may be configured to generate a signal (e.g., STATISTICS) in response to the analysis of the summation events. The signal STATISTICS may comprise the statistical information. The signal STATISTICS may be presented to the processor 184.

The processor 184 may be configured to process the statistical information about the summation events generated by the GCDs 110a-110m. In an example, the processor 184 may be configured to provide filtering for false events generated by the pixel circuits 60a-60n, determine flicker noise, and/or be used to toggle the signal BYPASS. The processor 184 may be configured to generate the signal SMART ACTIVATE in response to processing the statistical information about the summation events. In an example, the signal SMART ACTIVATE may be sent to an external host (e.g., a device external to the apparatus 100).

Referring to FIG. 8, a block diagram illustrating components of GCD circuits implementing absolute illuminance sensors configured to generate summation events for each cluster of pixels is shown. An Absolute Illuminance Sensors (AIS) implementation 180 comprising the GCD array 104 and the pixel clusters 120a-120m is shown. The summed photocurrents IPSUM copied from the pixel clusters 120a-120m in the signal IPCOPY may be presented to the GCD array 104. The GCD array 104 may comprise multiple of the GCD circuits 110a-110m implemented as absolute illuminance sensors.

The components of the GCD circuits 110a-110m are shown. The GCD circuits 110a-110m may each comprise one of the corresponding blocks (or circuits) 192a-192m, one of the corresponding blocks (or circuits) 194a-194m, one of the corresponding blocks (or circuits) 196a-196m and/or one of the corresponding blocks (or circuits) 198a-198m. The GCD array 104 may further comprise the logic gate 160 and the GCD handshake logic 162. The circuits 192a-192m may comprise current integrators. The circuits 194a-194m may comprise absolute illumination value circuits. The circuits 196a-196m may comprise subtraction circuits. The circuits 198a-198m may comprise absolute value comparators. The individual GCD circuits 110a-110m and/or the GCD array 104 may comprise other components (not shown). The number, type and/or arrangement of the components of the GCD circuits 110a-110m and/or the GCD array 104 may be varied according to the design criteria of a particular implementation.

The current integrators 192a-192m may be configured to receive the signal IPCOPY from the current mirrors 102a-102m. The current integrators 192a-192m may each be configured to integrate the copied summed photocurrents and convert the summed photocurrents to a voltage level. In one example, the current integrators 192a-192m may comprise a capacitive transimpedance amplifier (CTIA). In some embodiments, the current integrators 192a-192m may be configured to switch between an integration phase and a reset phase of the AIS implementation 190. The voltage levels may be presented to a respective one of the absolute illumination value circuits 194a-194m. Details of the current integrators 192a-192m may be described in association with FIGS. 11-12.

Each of the absolute illumination value circuits 194a-194m may be configured to receive the voltage levels from the respective one of the current integrators 192a-192m. The absolute illumination value circuits 194a-194m may be configured to provide an absolute value of the voltage level that corresponds to each of the pixel clusters 120a-120m. The absolute illumination value circuits 194a-194m may be configured to store a previous voltage level for each of the pixel clusters 120a-120m. Storing the previous voltage level may provide a reference for comparison to determine the amount of change in illumination over each cycle of an integration and reset phase. The absolute voltage levels may be presented to a respective one of the subtraction circuits 196a-196m.

Each of the subtraction circuits 196a-196m may be configured to receive the absolute voltage levels from the respective one of the absolute illumination value circuits 194a-194m. The subtraction circuits 196a-196m may be configured to subtract the voltage level detected (e.g., a sample taken at the time N) to the previous voltage level detected (e.g., a sample taken at the time N−1). The subtraction circuits 196a-196m may be configured to generate a difference (e.g., a delta value). The delta values may be presented to a respective one of the absolute value comparators 198a-198m.

Each of the absolute value comparators 198a-198m may be configured to receive the delta values from the respective one of the subtraction circuits 196a-196m. The absolute value comparators 198a-198m may be configured to compare the delta values to a null value. The summation events may be generated in response to the comparison. The absolute value comparators 198a-198m may be configured to generate the positive summation events (e.g., the signal POS) or the negative summation events (e.g., the signal NEG). In one example, the positive summation event may be generated if the delta value is greater than zero (e.g., for $\Delta V_{10}$: $\Delta V_1 - \Delta V_0 > 0$). In another example, the negative summation event may be generated if the delta value is less than zero (e.g., for $\Delta V_{10}$: $\Delta V_1 - \Delta V_0 < 0$). No summation event may be detected when the delta value is equal to zero (e.g., no significant change in contrast has occurred). Details of the sampling and resetting for determining the absolute values may be described in association with FIG. 17. The signal POS and/or the signal NEG generated by each of the absolute value comparators 198a-198m may be presented to the logic gate 160.

The logic gate 160 and the GCD handshake logic 162 may operate similar to the functionality described for the implementation 150 described in association with FIG. 5. The logical OR result of the positive summation events and the negative summation events may be used to generate the signal ACTIVATE for the digital core 56. In the AIS implementation 190, the GCD handshake logic 162 may present the reset signal RST to the subtraction circuits 196a-196m in response to the signal ACKB. In the example of the AIS implementation 190, the reset signal RST may be an internal signal used by the GCD circuits 110a-110m.

The AIS implementation 190 of the GCD array 104 may be configured as Absolute Illuminance Sensors (AIS). The AIS implementation 190 may merge the summation events into a single signal (e.g., the activation signal ACTIVATE). The AIS implementation 190 may be configured to convert the photocurrent sum (e.g., the signal IPSUM copied as the signal IPCOPY) into voltage levels. The voltage level from a previous photocurrent summation sample may be used as a reference value for comparison with a currently sampled summation photocurrent voltage value to generate the positive summation events and/or the negative summation events.

In the AIS implementation 190, the digital core 56 may be in the inactive mode of operation. Since the digital core 56 is in the inactive mode of operation, the apparatus 100 may not be able to make a distinction between contrast changes in the various pixel clusters 120a-120m. The pixel array 52 may be disabled or enabled. The signal ACTIVATE may be a logical OR of the positive and negative summation events presented to the digital core 56 (not shown). The digital core 56 may be activated in response to the signal ACTIVATE. Similarly, a de-assertion of the bypass signal by the GCDs 110a-110m to enable the pixel array 52 may be a logical OR of the positive and negative summation events.

Figure 9:
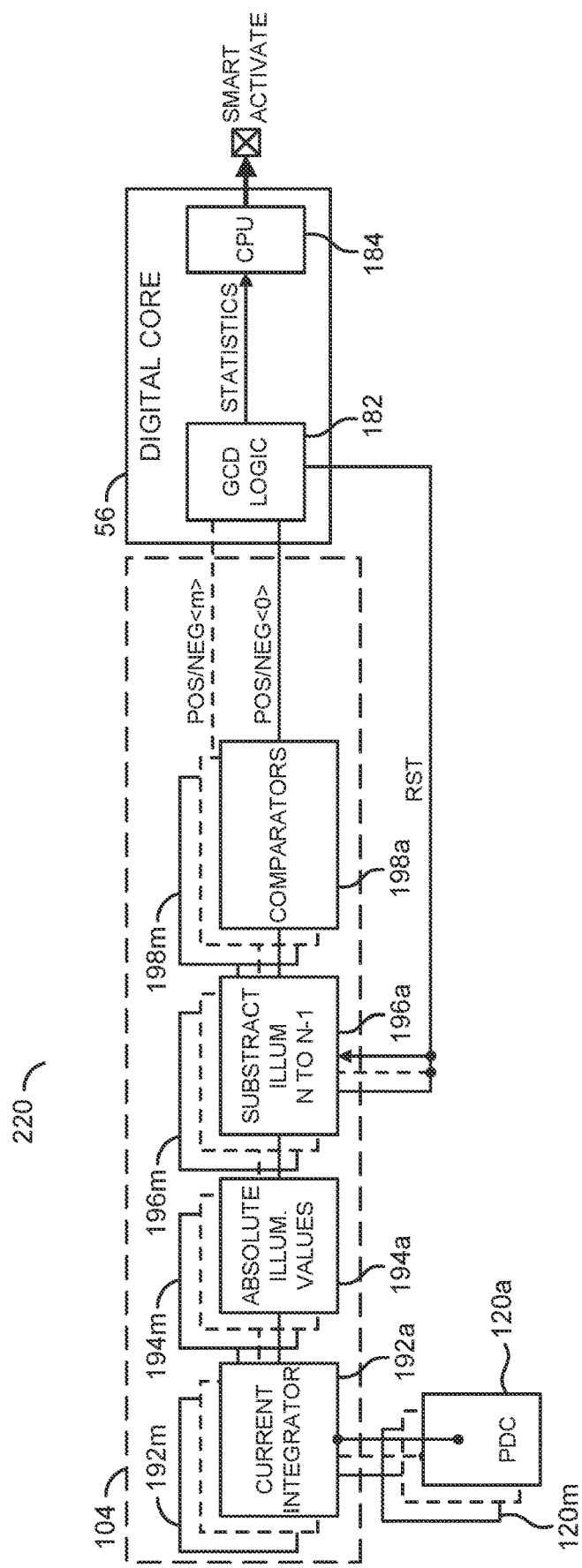
FIG. 9 is a block diagram illustrating components of GCD circuits implementing absolute illuminance sensors configured to provide summation events to an activated digital core.

Referring to FIG. 9, a block diagram illustrating components of GCD circuits implementing absolute illuminance sensors configured to provide summation events to an activated digital core is shown. An activated AIS implementation 220 comprising the digital core 56, the GCD array 104 and the pixel clusters 120a-120m is shown. The summed photocurrents IPSUM copied from the pixel clusters 120a-120m may be presented to the GCD array 104. The activated AIS implementation 220 may be similar to the AIS implementation 190 shown in association with FIG. 8.

In the activated AIS implementation 220, the GCD circuits 110a-110m may comprise the current integrators 192a-192m, the absolute illumination value circuits 194a-194m, the subtraction circuits 196a-196m and the absolute value comparators 198a-198m. In the activated AIS implementation 220, the digital core 56 may be activated (e.g., in the normal mode of operation) and the pixel array 52 may be disabled or enabled. In some embodiments, the GCDs 110a-110m may comprise a simplified AIS implementation with the absolute voltage levels from the absolute illumination value circuits 194a-194m time multiplexed to a single value and presented to a single subtraction circuit 196 and compared using a single comparator 198. With the digital core 56 in the activated mode of operation, the apparatus 100 may be able to make a distinction between illuminance changes in each of the different pixel clusters 120a-120m. In an example, the GCD circuits 110a-110m in the activated AIS implementation 220 may be configured to provide all positive summation events and all negative summation events corresponding to all of the pixel clusters 120a-120m (e.g., based on the summed photocurrents IPSUM[0-M]).

Similar to the activated RIS implementation 180, described in association with FIG. 7, with the digital core 56 activated, the GCD logic 182 may be configured to analyze the summation events. The GCD logic 182 may be configured to generate the statistical information about positive summation events and the digital summation generated in response to the absolute illumination sensors of the AIS implementation 220. The processor 184 may be configured to generate the signal SMART ACTIVATE for an external host in response to the statistical information. Other functionality (e.g., flicker filtering) may be performed by the processor 184.

Figure 10:
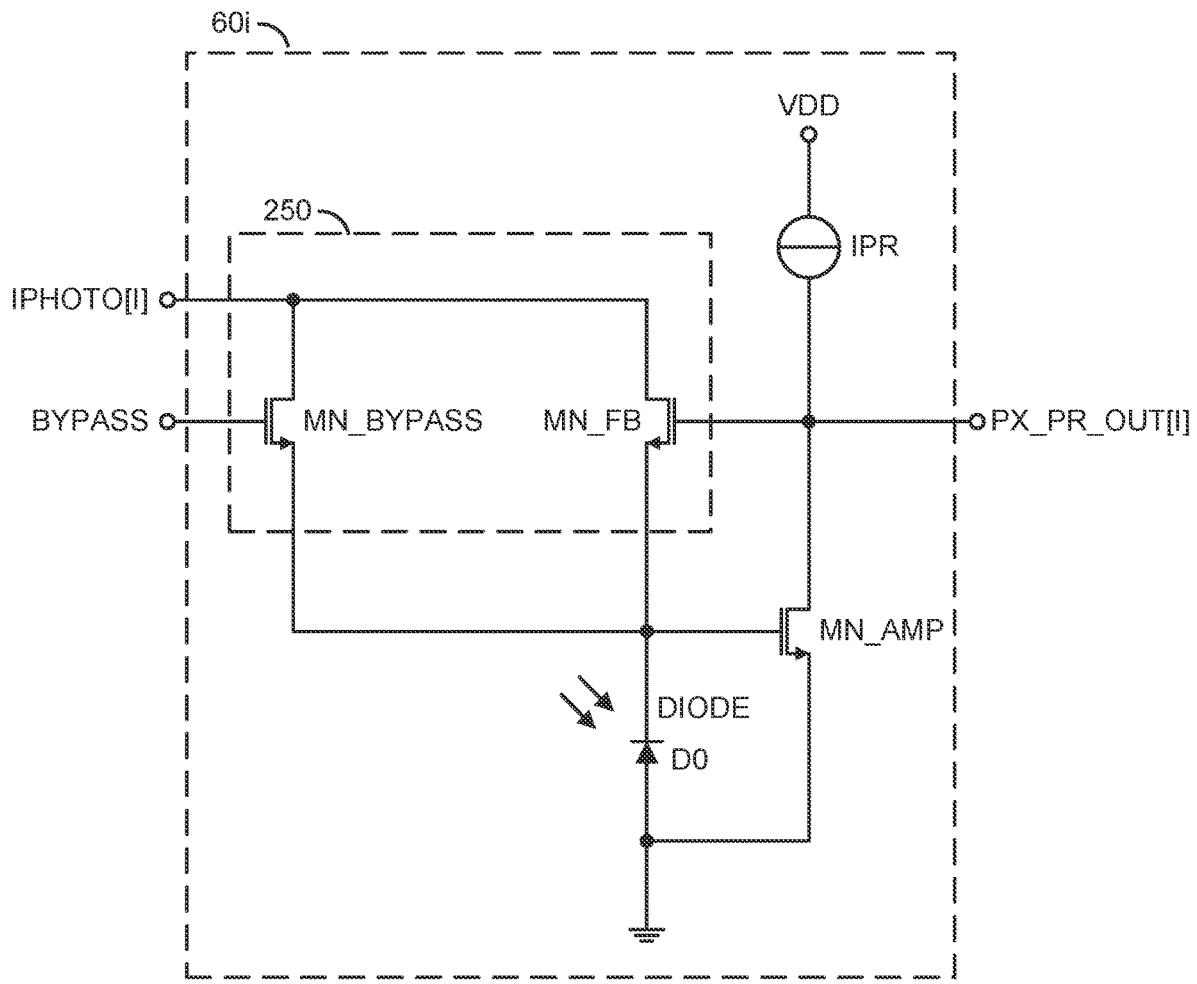
FIG. 10 is a diagram illustrating an embodiment of an event-based pixel circuit than can be bypassed.

Referring to FIG. 10, a diagram illustrating an event-based pixel circuit comprising a bypass transistor is shown. An example embodiment of the pixel circuit 60i is shown. The pixel circuit 60i is shown as a representative example of any of the pixel circuits 60a-60n implemented by the pixel array 52. The example embodiment of the pixel circuit 60i shown may be one physical implementation of the event-based pixel. Other implementations of an event-based pixel circuit may be implemented according to the design criteria of a particular implementation.

The pixel circuit 60i may be configured to receive one of the photocurrents IPHOTO[I] from the photodiode 50i and the signal BYPASS (e.g., from either the GCD array 104 or the digital core 56). The pixel circuit 60i may be configured to generate a signal (e.g., PX_PR_OUT[I]). Each of the pixel circuits 60a-60n may be configured to generate a respective one of the signals PX_PR_OUT[0-N]. The signals PX_PR_OUT[0-N] may be a pixel analog output. The pixel analog output may be operated on by other stages (not shown) before being output from the pixel array 52 as the event stream EVSTM. In an example, the pixel array 52 may implement analog processing, comparators, latches, etc. that may operate on the analog pixel output before producing the pixel digital output (e.g., the event stream EVSTM).

The pixel circuit 60i may comprise a circuit 250, a current source (e.g., IPR), a diode D0 and/or a transistor MN_AMP. The current source IPR may be connected between a voltage source VDD and a node of the output PX_PR_OUT[I]. A drain terminal of the transistor MN_AMP may be connected to the node of the output PX_PR_OUT[I]. A source terminal of the transistor MN_AMP may be connected to an anode of the diode D0 and ground. The gate terminal of the transistor MN_AMP may be connected to a second end of the diode D0.

The circuit 250 may comprise a bypass transistor MN_BYPASS connected to disable (i.e., bypass) the pixel circuit 60i. The circuit 250 may be configured to conduct the photocurrent IPHOTO[I] and receive the signal BYPASS. The transistor MN_BYPASS may be connected in parallel to a transistor MN_FB, which may conduct the photocurrent IPHOTO[I]. The gate terminal of the transistor MN_FB may be connected to the drain terminal of the transistor MN_AMP at the node of the output PX_PR_OUT[I]. The elements MN_FB, MN_AMP and IPR form a logarithmic transimpedance amplifier, converting the photocurrent drained by the diode D0 to a voltage at node PX_PR_OUT[I]. A source terminal of the transistor MN_BYPASS may be connected to the node at the cathode of the diode, the gate terminal of the transistor MN_AMP and a source terminal of the transistor MN_FB. A gate terminal of the transistor MN_BYPASS may receive the signal BYPASS. The transistor MN_BYPASS is connected in the pixel circuit 60i as a bypass transistor to disable the pixel circuit while still collecting the photocurrent for the summed photocurrents. Turning on the bypass transistor offers a low impedance path for the photocurrent, diverting the photocurrent from the transistor MN_FB and preventing the pixel circuit from generating events.

The signal BYPASS may be provided by the digital core 56 and/or from the GCD circuits 110a-110m. In one example, the signal BYPASS may be generated in response to a logical OR operation of the positive summation event and/or the negative summation event that corresponds to one of the pixel clusters 120a-120m that corresponds with the pixel circuit 60i. When the pixel array 52 is in the low power mode of operation, the entire pixel array 52 may be bypassed and disabled. Moreover, the current source IPR may be turned off to provide power savings. When the signal BYPASS is asserted, the circuit 250 prevents the photocurrent signal IPHOTO[I] from being detected by the pixel circuit 60i. When in, addition, the current source IPR is turned off, the pixel circuit no longer consumes the IPR current. The positive summation events and/or the negative summation events may be configured to enable a normal operation of the pixel circuit, i.e., when the current source IPR is turned on and the signal BYPASS is de-asserted, the photocurrent IPHOTO[I] is used to produce the pixel analog output PX_PR_OUT[I].

Whether the pixel circuit 60i is turned off or on, the photocurrent IPHOTO[I] may be summed as a component of one of the summation currents IPSUM[0-M]. The summed photocurrents or cluster photocurrent IPSUM[0-M] may be copied by one of the current mirrors 102a-102m. The copied version of the cluster photocurrent IPCOPY[0-M] may be presented to the GCD array 104. In one example, the pixel circuits 60a-60n may be shutdown while the GCD array 104 is still collecting the photocurrent. In another example, the pixel circuits 60a-60n may be generating the pixel analog output for the event stream EVSTM without being affected by the GCD array 104 collecting the summed photocurrents.

Generally, the signal BYPASS may be activated when the pixel circuits 60a-60n (and all the corresponding bias sources such as IPR, etc.) are turned off. In an example, the signal BYPASS may be activated when the digital core 56 is in a low power (or inactive) mode of operation. When the pixel circuits 60a-60n are turned on, the signal BYPASS may be turned off. The GCDs 110a-110m may be configured to operate (e.g., generate the summation events) simultaneously with the pixel circuits 60a-60n (e.g., generate the event stream EVSTM). In an example, when the pixel circuits 60a-60n and one or more of the GCDs 110a-110m are functional at the same time, there may be no impact on the performance of the pixel array 52 and/or the GCD array 104.

The bypass transistor MN_BYPASS and corresponding signal BYPASS may have other applications. For instance, during a test and characterization phase of the pixels before production, the bypass transistor may be enabled to redirect all current produced by the photodiode D0. The effect is that the pixel front-end circuitry operates in static conditions independent of the light changes. This allows to test and characterize the pixel circuitry in static light conditions, such as by measuring the background rate (BGR).

Figure 11:
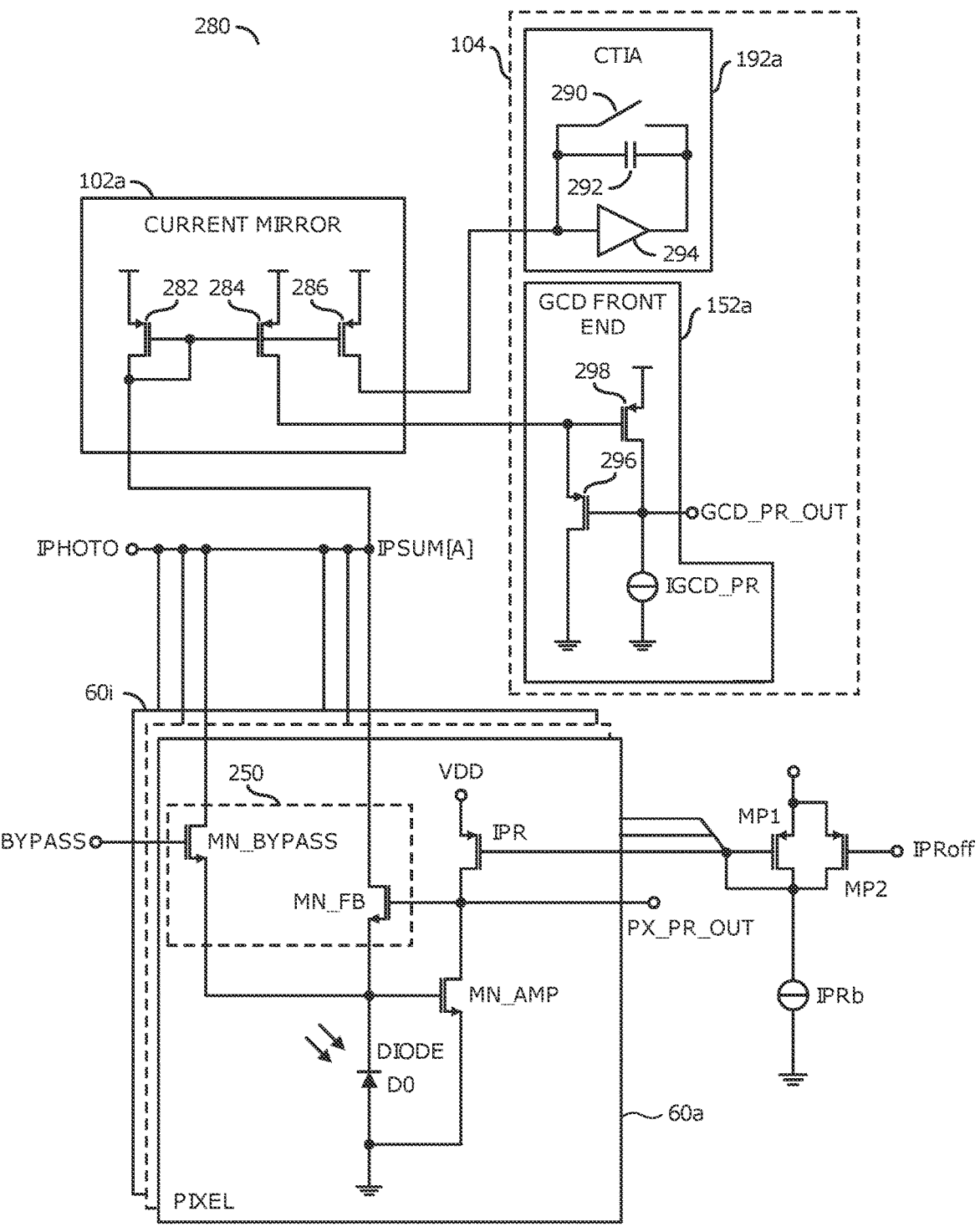
FIG. 11 is a diagram illustrating a front-end circuit configured to implement relative and absolute illuminance detection.

Referring to FIG. 11, a diagram illustrating a front-end circuit configured to implement relative and absolute illuminance detection is shown. A circuit portion 280 of an example embodiment of the apparatus 100 is shown. The circuit portion 280 may comprise an example embodiment of a front-end circuit configured to implement the relative and absolute illuminance sensors. The circuit portion 280 may comprise one of the pixel clusters 120a-120m (e.g., a cluster comprising the pixel circuits 60a-60i), the current mirror 102a and the GCD array 104.

Components of the pixel circuit 60a are shown as a representative example of the components of the pixel circuits 60a-60i in the pixel cluster (e.g., the pixel cluster 120a). Each of the pixel circuits 60a-60i may be implemented similar to the example pixel circuit 60i described in association with FIG. 10.

The photocurrent IPHOTO from the photodiodes 50a-50n may be presented to each of the pixel circuits 60a-60n (e.g., the pixel circuits 60a-60i in the pixel cluster 120a and each of the other pixel circuits in the pixel array 52). The circuit 250 of the pixel circuits 60a-60i may enable the photocurrent IPHOTO from the pixel circuits 60a-60i may be summed to provide the summed photocurrents signal IPSUM, whether the pixel circuits 60a-60i are active or inactive. In the example shown, the summed photocurrents for the pixel cluster 120a may provide the summed photocurrent IPSUM[A]. The signal IPSUM[A] may be presented to the current mirror 102a.

The current mirror 102a may be a representative example of one or more of the current mirrors 102a-102m implemented by the apparatus 100. The current mirror 102a may comprise a circuit 282, a circuit 284 and a circuit 286. Each of the circuits 282-286 may implement a transistor. In the example shown, each of the transistors 282-286 may implement a PMOS transistor. A drain of the transistor 282 may receive the signal IPSUM[A]. The drain of the transistor 282 may be connected to the gate of the transistor 282. The source of the transistor 282 may be connected to a voltage source (e.g., VDD). The source of the transistor 284 may be connected to a voltage source (e.g., VDD). The gate of the transistor 284 may be connected to the gate and drain of the transistor 282 and the gate of the transistor 286. The drain of the transistor 284 may be an output of the current mirror 102a. The drain of the transistor 284 may be present the copied photocurrent (e.g., IPCOPY[A]) to the GCD front end circuit 152a. The source of the transistor 286 may be connected to a voltage source (e.g., VDD). The drain of the transistor 286 may be an output of the current mirror 102a. The drain of the transistor 286 may present the copied photocurrent (e.g., IPCOPY[A]) to the current integrator 192a. In an example, the current mirror 102a may be configured to receive the summed photocurrent IPSUM[A], perform an adjustment (e.g., a gain or attenuation) to the summed photocurrent and copy the adjusted photocurrent IPCOPY[A] to the components of the GCD array 104.

In the example shown, the current integrator 192a may be implemented as a Capacitive Transimpedance Amplifier (CTIA). The CTIA 192a may comprise a reset switch 290, an integrating capacitor 292, and an amplifier 294. In some embodiments, the CTIA 192a may further comprise an input coupling capacitor. The input coupling capacitor may be implemented to decouple the photo diode voltage from the input of the amplifier 294. The capacitor 292 and the amplifier 294 may be configured to integrate the copied photocurrent IPCOPY[A] during an integration phase of the AIS. The reset switch 290 may enable the AIS to toggle between the reset phase and the integration phase. The integrated current may be presented to the respective absolute illumination values circuit 194a (shown in association with FIG. 8).

The GCD front end 152a may be configured to generate the output GCD_PR_OUT in response to the copied photocurrent IPCOPY[A]. The GCD front end 152a may comprise a current source IGCD_PR, a transistor 296 and a transistor 298. The source of the transistor 296 may be configured to receive the copied photocurrent IPCOPY[A]. The source of the transistor 296 may be connected to the gate of the transistor 298. A gate of the transistor 296 may be connected to a node comprising a drain of the transistor 298, the output GC_DPR_OUT and the current source IGCD_PR. The drain of the transistor 296 may be connected to a ground. The source of the transistor 298 may be connected to a voltage source (e.g., VDD). The current source IGCD_PR may be implemented between a ground and a node comprising the gate of the transistor 296, the drain of the transistor 298 and the output GCD_PR_OUT. The output GCD_PR_OUT may be presented to the respective one of the GCD low-pass filters 154a (shown in association with FIG. 5).

FIG. 11 further shows an embodiment of the current sources IPR of the pixel circuits 60a-60i. The current source, shown for pixel circuit 60a, comprises a PMOS transistor IPR having its source connected to VDD and its drain connected to the drain of transistor MN_AMP. Transistor IPR forms the output of a current mirror. The input of the current mirror is formed by a diode-connected PMOS transistor MP1, common to all pixel circuits. The gates of all transistors IPR are connected to the gate of transistor MP1. The gate and drain of transistor MP1 are connected together to a bias current source IPRb, and the source of transistor MP1 is connected to VDD.

A PMOS transistor MP2 is connected parallel to transistor MP1, and its gate is controlled by an active-low signal IPRoff serving the purpose of turning off all current sources IPR. When signal IPRoff is inactive (high), transistor MP2 is off while transistor MP1 conducts the current from source IPRb. This current is then copied to all transistors IPR. When signal IPRoff is active (low), the gates of transistors IPR are connected to VDD, turning all transistors IPR off.

Figure 12:
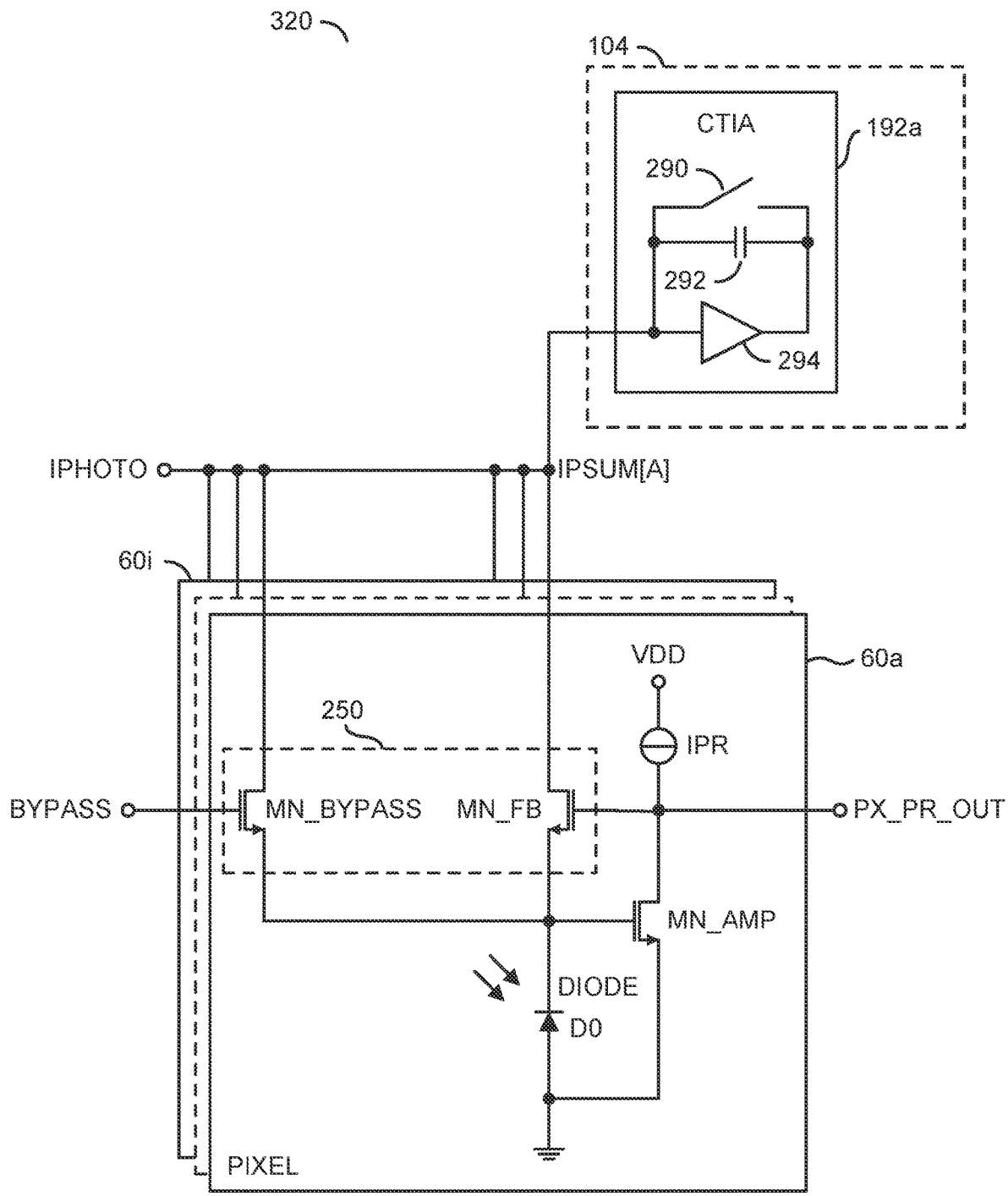
FIG. 12 is a diagram illustrating a front-end circuit configured to implement a basic version of absolute illuminance detection.

Referring to FIG. 12, a diagram illustrating a front-end circuit configured to implement a basic version of absolute illuminance detection is shown. A circuit portion 320 of an example embodiment of the apparatus 100 is shown. The circuit portion 320 may be comprise an example embodiment of a front-end circuit configured to implement only an absolute illuminance sensor. The circuit portion 320 may comprise one of the pixel clusters 120a-120m (e.g., a cluster comprising the pixel circuits 60a-60i) and the GCD array 104. The circuit portion 320 shown may represent a basic version of absolute illuminance sensing.

Components of the pixel circuit 60a are shown as a representative example of the components of the pixel circuits 60a-60i in the pixel cluster (e.g., the pixel cluster 120a). Each of the pixel circuits 60a-60i may be implemented similar to the example pixel circuit 60i described in association with FIG. 10.

The photocurrent IPHOTO from the photodiodes 50a-50n may be presented to each of the pixel circuits 60a-60n (e.g., the pixel circuits 60a-60i in the pixel cluster 120a and each of the other pixel circuits in the pixel array 52). The circuit 250 of the pixel circuits 60a-60i may enable the photocurrent IPHOTO from the pixel circuits 60a-60i may be summed to provide the summed photocurrents signal IPSUM, whether the pixel circuits 60a-60i are active or inactive. In the example, shown, the summed photocurrents for the pixel cluster 120a may provide the summed photocurrent IPSUM[A].

In the basic implementation of the absolute illuminance detection of the circuit portion 320, the current mirrors 102a-102m may not be implemented. For example, the GCD array 104 may comprise a single GCD circuit 110a. The summed photocurrent IPSUM[A] may be presented to an input of the current integrator 192a. The current integrator 192a may implement the CTIA as shown in association with FIG. 11.

Figure 13:
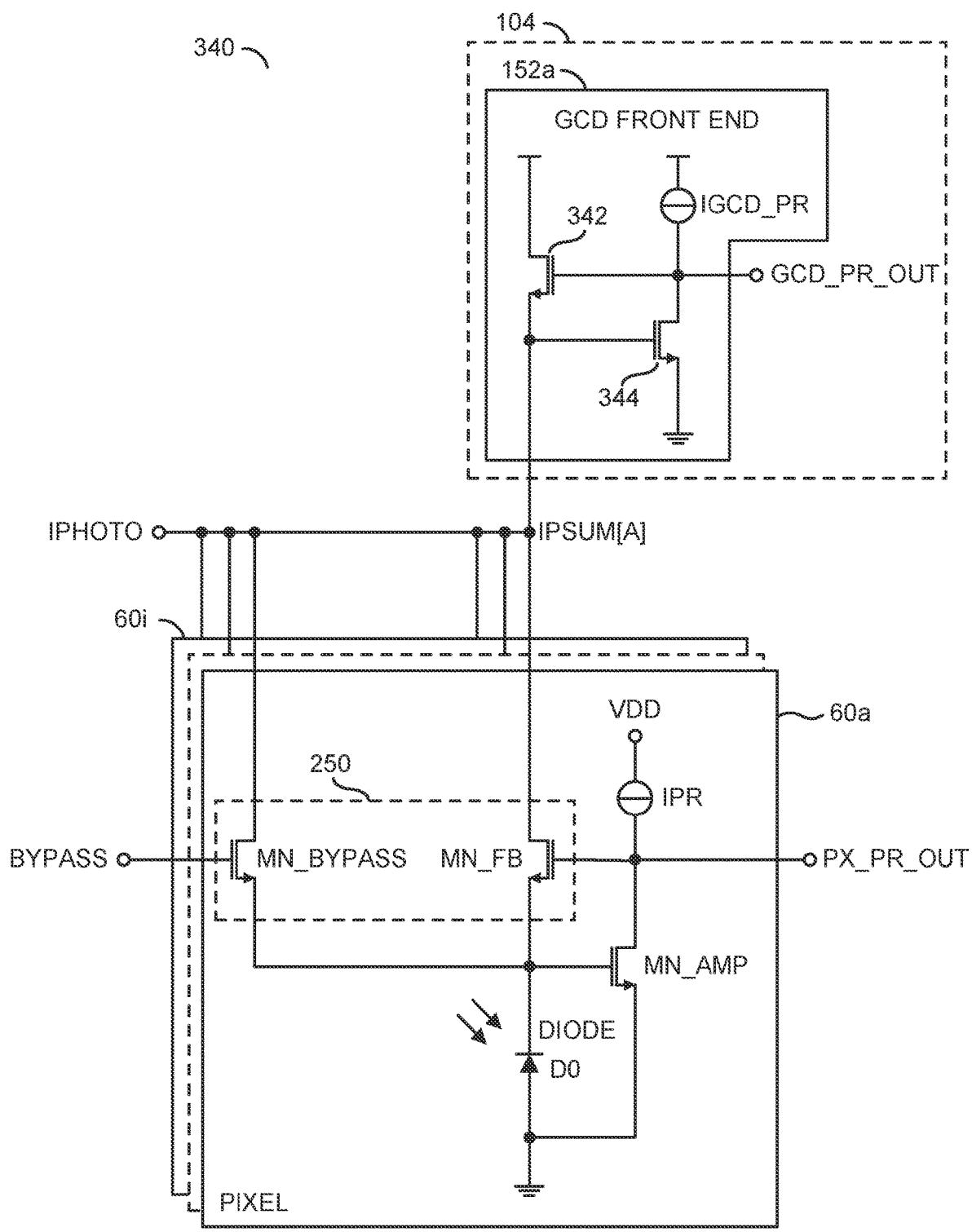
FIG. 13 is a diagram illustrating a front-end circuit configured to implement a basic version of relative illuminance detection.

Referring to FIG. 13, a diagram illustrating a front-end circuit configured to implement a basic version of relative illuminance detection is shown. A circuit portion 340 of an example embodiment of the apparatus 100 is shown. The circuit portion 340 may comprise an example embodiment of a front-end circuit configured to implement only a relative illuminance sensor. The circuit portion 340 may comprise one of the pixel clusters 120a-120m (e.g., a cluster comprising the pixel circuits 60a-60i) and the GCD array 104. The circuit portion 340 shown may represent a basic version of relative illuminance sensing.

Components of the pixel circuit 60a are shown as a representative example of the components of the pixel circuits 60a-60i in the pixel cluster (e.g., the pixel cluster 120a). Each of the pixel circuits 60a-60i may be implemented similar to the example pixel circuit 60i described in association with FIG. 10.

The photocurrent IPHOTO from the photodiodes 50a-50n may be presented to each of the pixel circuits 60a-60n (e.g., the pixel circuits 60a-60i in the pixel cluster 120a and each of the other pixel circuits in the pixel array 52). The circuit 250 of the pixel circuits 60a-60i may enable the photocurrent IPHOTO from the pixel circuits 60a-60i may be summed to provide the summed photocurrents signal IPSUM, whether the pixel circuits 60a-60i are active or inactive. In the example, shown, the summed photocurrents for the pixel cluster 120a may provide the summed photocurrent IPSUM[A].

In the basic implementation of the relative illuminance detection of the circuit portion 340, the current mirrors 102a-102m may not be implemented. For example, the GCD array 104 may comprise a single GCD circuit 110a. The summed photocurrent IPSUM[A] may be presented to an input of the GCD front-end circuit 152a. In the basic implementation of the relative illuminance detection implemented by the circuit portion 340, the pixel array 52 and the GCD circuits 110a-110m may be functionally exclusive. For example, the pixel array 52 may be turned off and bypassed when the GCD circuits 110a-110m are turned on.

The GCD front-end circuit 152a may be configured to generate the output GC_DPR_OUT in response to the summed photocurrent IPSUM[A]. The GCD front-end circuit 152a may comprise the current source IGCD_PR, a transistor 342 and a transistor 344. In the example shown, the transistor 342 and the transistor 344 may be implemented as NMOS transistors. A drain of the transistor 342 may be connected to a voltage source (e.g., VDD). A source of the transistor 342 may be connected to a node that may be connected to a gate of the transistor 344 and may receive the summed photocurrent IPSUM[A]. A gate of the transistor 342 may be connected to a node that may be connected to drain of the transistor 344, the current source IGCD_PR and the output GCD_PR_OUT. The source of the transistor 344 may be connected to a ground. The current source IGCD_PR may be connected between a current source (e.g., VDD) and the node comprising the gate of the transistor 342, the drain of the transistor 344 and the output GCD_PR_OUT. The output GCD_PR_OUT may be presented to the GCD low-pass filter 154a as shown in association with FIG. 5.

Figure 14:
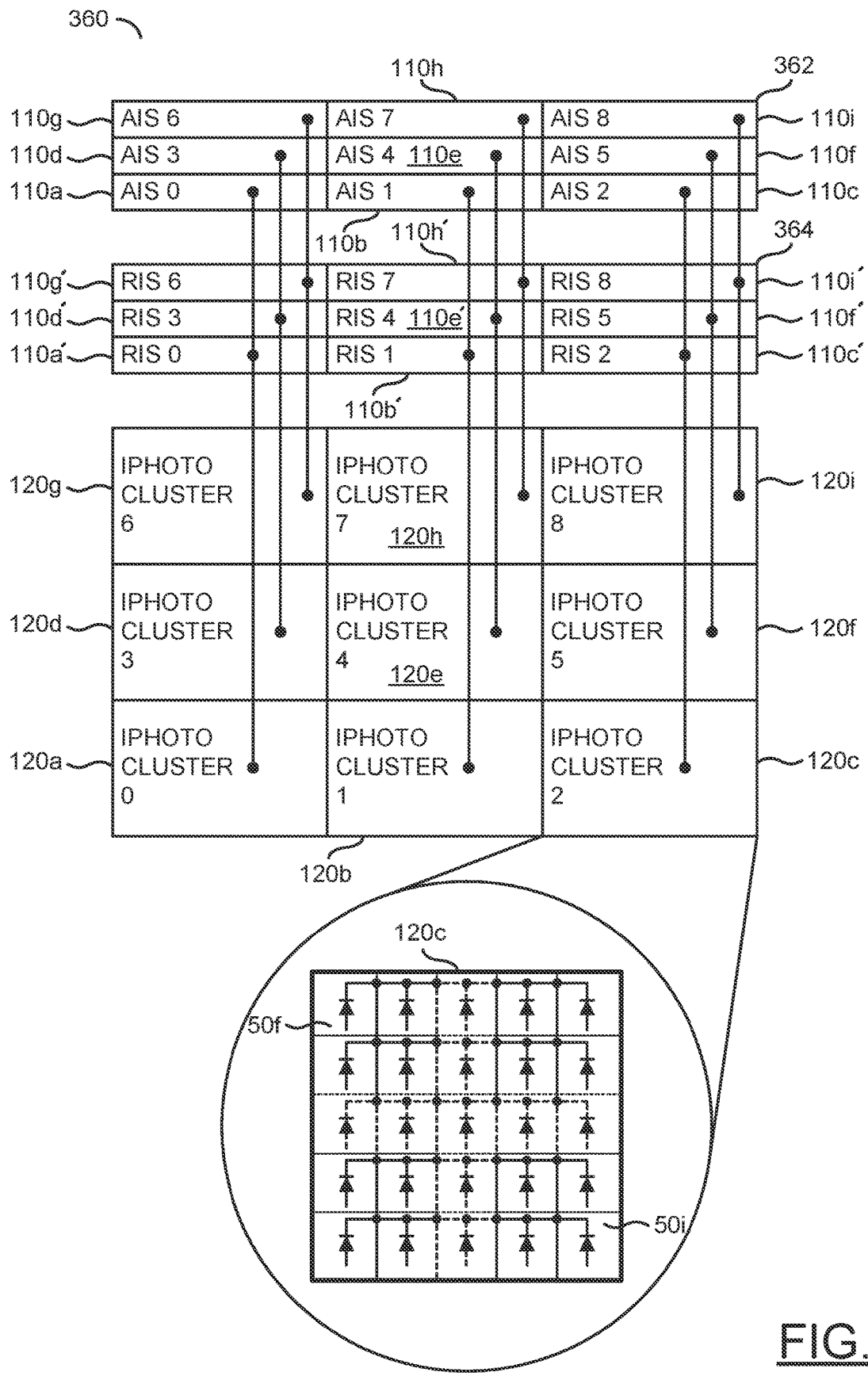
FIG. 14 is a diagram illustrating clusters of pixels with relative and absolute illuminance sensors.

Referring to FIG. 14, a diagram illustrating clusters of pixels with relative and absolute illuminance sensors is shown. A representation 360 is shown. The representation 360 may comprise the pixel clusters 120a-120i, an AIS block 362, a RIS block 364. The representation 360 may provide an example of the apparatus 100 implementing both AIS and RIS to measure contrast changes captured by the pixel clusters 120a-120i.

In the example shown, the pixel array 52 may comprise the pixels clusters 120a-120i. Each of the pixel clusters 120a-120i may comprise a number of the pixel circuits 60a-60n. Each of the pixel clusters 120a-120i may be configured to receive one or more of the photocurrents IPHOTO[0-N]. In the example shown, as a representative example, the pixel cluster 120c is shown comprising the photocurrents generated by a subset of the photodiodes 50f-50i. Each of the subset of the photodiodes 50f-50i may generate one of the photocurrents IPHOTO[F-I], which may be received by the subset of the pixel circuits 60a-60n in the pixel cluster 120c. Each of the pixel clusters 120a-120i may be configured to generate one of the summed photocurrents IPSUM[0-I].

The summed photocurrents IPSUM[0-I] may be presented to the respective current mirrors 102a-102i (not shown). The current mirrors 102a-102i may copy the summed current photocurrents and present the copied photocurrents IPCOPY[0-I] to the GCD array 104. The GCD array 104 may comprise the AIS block 362 and the RIS block 364.

The AIS block 362 may comprise the GCDs 110a-110i implemented as AIS. Each of the AIS GCDs 110a-110i may be associated with a respective one of the pixel clusters 120a-120i. The AIS GCDs 110a-110i may be configured to measure the absolute illuminance values of each of the pixel clusters 120a-120i. For example, the AIS GCD 110a may be configured to receive the copied photocurrent IPCOPY[0] generated from the summed photocurrent IPHOTO[0] provided by the pixel clusters 120a and determine the absolute illuminance value, which may be used to generate one of the summation events.

The RIS block 364 may comprise the GCDs 110a'-110i' implemented as RIS. Each of the RIS GCDs 110a'-110i' may be associated with a respective one of the pixel clusters 120a-120i. The RIS GCDs 110a'-110i' may be configured to measure the relative illuminance changes of each of the pixel clusters 120a-120i. For example, the RIS GCD 110a' may be configured to receive the copied photocurrent IPCOPY[0] generated from the summed photocurrent IPHOTO[0] provided by the pixel clusters 120a and determine the relative illuminance change, which may be used to generate one of the summation events.

The representation 360 may implement both relative and absolute sensing. Absolute measurement values and relative measurement changes may be detected for each of the pixel clusters 120a-120i. In some embodiments, the apparatus 100 may be configured to dynamically switch between measuring the contrast changes (e.g., generating the summation events) using RIS or AIS. In an example, the digital core 56 and/or other components of the apparatus 100 may be configured to analyze a scene captured in the environment to determine whether to perform the contrast detection using AIS or RIS. For example, characteristics of a particular scene may be determined by analyzing the event stream EVSTM (e.g., a frequency of contrast changes, locations of contrast changes, the amount of the contrast change between events, an amount of ambient light available, a number of contrast changes, etc.). In another example, AIS measurements or RIS measurements may be selected based on particular constraints of an application and/or as desired by an end user.

Generally, performing the measurements using RIS may provide a larger dynamic range compared to performing measurements using AIS and may enable detecting contrast within a wide range of IPHOTO currents. Generally, performing the measurements using AIS may enable accurately detecting very small contrast changes compared to performing measurements using RIS. In one example, RIS may be selected for applications where the ambient light may change drastically and high accuracy may not be an important factor. In another example, AIS may be selected for applications where background/ambient light may be more static, but higher accuracy may be an important factor for detecting small contrasts. In yet another example, AIS may be configured to provide an absolute measurement of light detected in addition to detecting contrast changes. For example, the digital core 56 may select the AIS measurement in order to enable a value to be generated that indicates an absolute light measurement. The parameters and/or scenarios for selecting between AIS and RIS for measuring the summation of the photocurrents may be varied according to the design criteria of a particular implementation.

Figure 15:
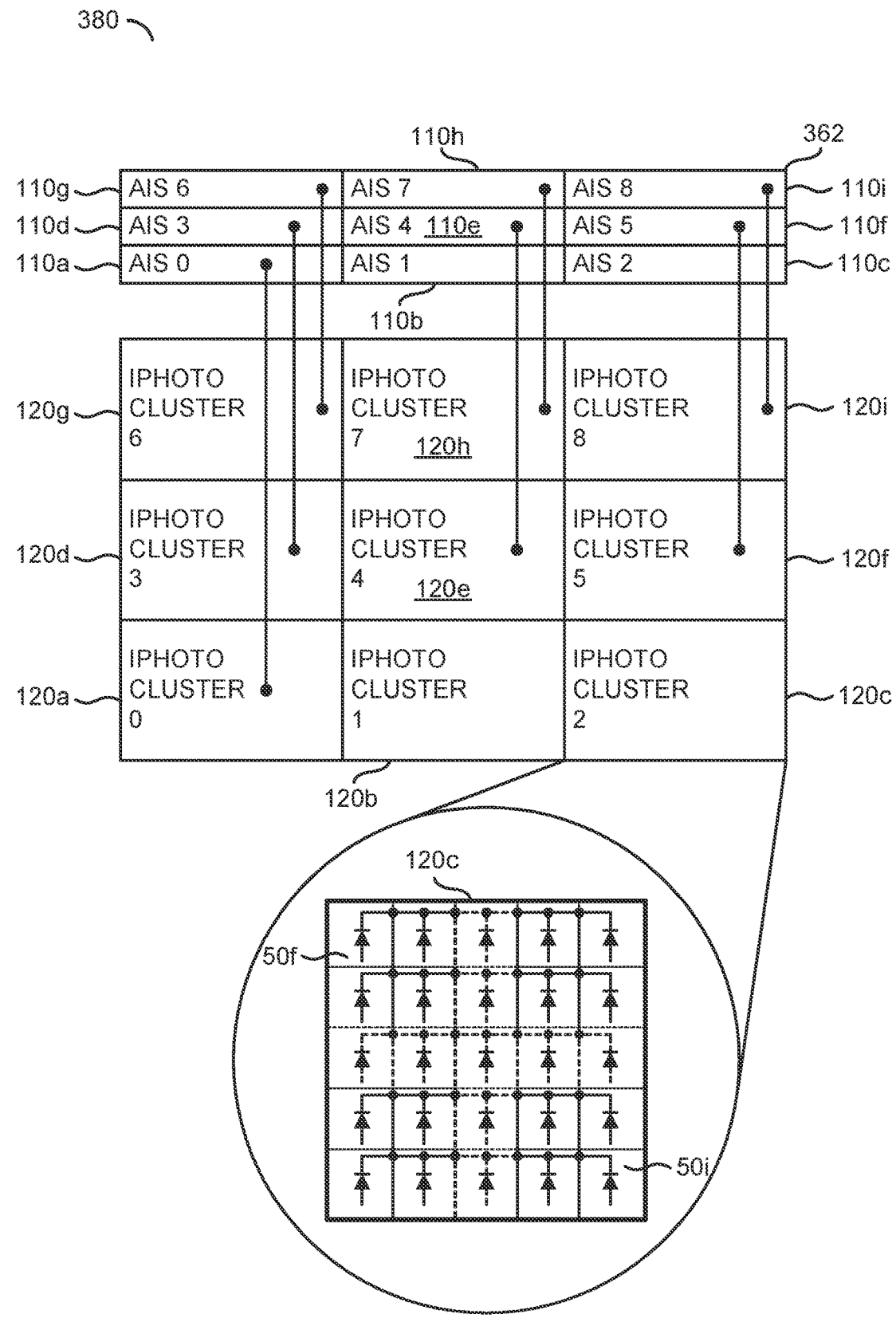
FIG. 15 is a diagram illustrating clusters of pixels with absolute illuminance sensors.

Referring to FIG. 15, a diagram illustrating clusters of pixels with absolute illuminance sensors is shown. A representation 380 is shown. The representation 380 may comprise the pixel clusters 120a-120i and the AIS block 362. The representation 380 may provide an example of the apparatus 100 implementing AIS only to measure contrast changes captured by the pixel clusters 120a-120i.

As described in association with FIG. 14, each of the pixel clusters 120a-120i may be configured to generate one of the summed photocurrents IPSUM[0-I]. The summed photocurrents IPSUM[0-I] may be presented to the respective current mirrors 102a-102i (not shown). The current mirrors 102a-102i may copy the summed current photocurrents and present the copied photocurrents IPCOPY[0-I] to the GCD array 104. The GCD array 104 may comprise the AIS block 362.

The AIS block 362 may comprise the GCDs 110a-110i implemented as AIS. Each of the AIS GCDs 110a-110i may be associated with a respective one of the pixel clusters 120a-120i. The AIS GCDs 110a-110i may be configured to measure the absolute illuminance values of each of the pixel clusters 120a-120i. For example, the AIS GCD 110a may be configured to receive the copied photocurrent IPCOPY[0] generated from the summed photocurrent IPHOTO[0] provided by the pixel clusters 120a and determine the absolute illuminance value, which may be used to generate one of the summation events.

The representation 380 may implement absolute sensing but not relative sensing. Absolute measurement values may be detected for each of the pixel clusters 120a-120i. By making the illuminance difference between two absolute values, a relative value can be determined. Implementing only one type of illuminance sensor (e.g., either AIS or RIS) may provide cost savings compared to implementing both types at a cost of reduced flexibility in detection.

Figure 16:
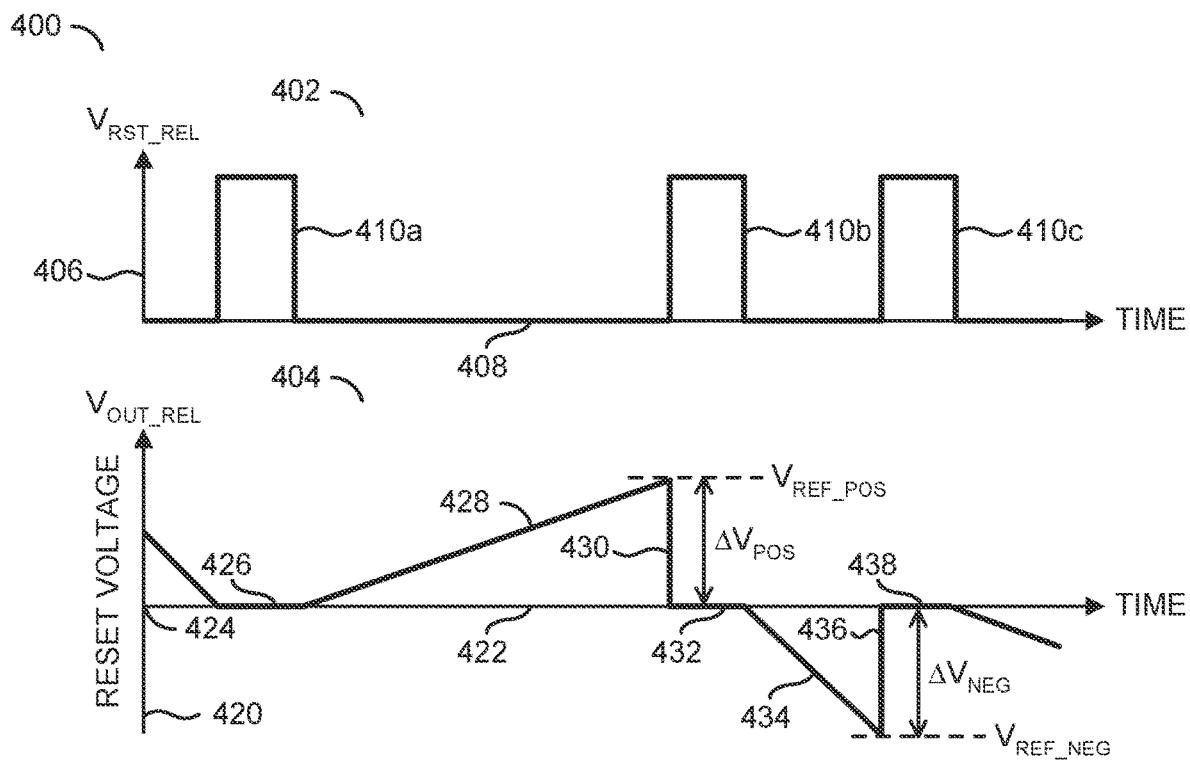
FIG. 16 is a graph illustrating relative sensing waveforms.

Referring to FIG. 16, a graph illustrating relative sensing waveforms is shown. Relative sensing graphs 400 are shown. The relative sensing graphs 400 may comprise a graph 402, and a graph 404. The graph 402 may be a reset signal graph. The graph 404 may be a relative voltage output graph.

The reset signal graph 402 may illustrate the signal RST for a RIS implementation of one or more of the GCDs 110a-110m. For example, the reset signal graph 402 may comprise the signal RST as shown in association with FIGS. 5-7. The reset signal graph 402 may comprise an axis 406 and an axis 408. The axis 406 may represent a voltage level of the signal RST. The axis 408 may represent time.

The reset signal graph 402 may comprise a number of reset activations 410a-410c. The reset activations 410a-410c may illustrate when the signal RST has been asserted. In the example shown, the signal RST may be activated at three different times. In some embodiments, the signal RST may be generated in response to the signal ACKB after one of the summation events has been generated. For the RIS implementation, the signal RST may not necessarily be asserted according to a particular frequency.

The relative voltage output graph 404 may illustrate the output voltage. In an example, the output voltage may be the voltage generated by the GCD high-pass filter and gain stages 156a-156m shown in association with FIGS. 5-7 (e.g., the signal GCD_DIFF_OUT). The relative voltage output graph 404 may comprise an axis 420 and an axis 422. The axis 420 may represent the relative voltage output. The axis 422 may represent time. The reset signal graph 402 and the relative voltage output graph 404 may be aligned with respect to time.

A reset voltage 424 is shown. The reset voltage 424 may represent a predefined level of reference voltage level that the output voltage is reset to in response to the signal RST. The output voltage may increase or decrease according to the change in illuminance. For example, the increase or decrease of the output voltage may be determined based on the summation of the photocurrents. The output voltage may be compared to positive and negative reference voltages (e.g., the positive reference voltage VREF_POS and the negative reference voltage VREF_NEG).

At a time of the reset activation 410a, a value 426 of the output voltage may be reset to the reset voltage 424. In response to the summation of the photocurrents generated in response to an increase in illuminance, an increasing level 428 of the output voltage may be generated. The increasing level 428 of the output voltage may cross (e.g., reach, exceed, go higher than, etc.) the positive reference voltage VREF_POS. A positive summation event may be generated in response to the output voltage crossing the positive reference voltage VREF_POS. The signal RST may be generated after the summation event has been acknowledged to reset the GCD.

The reset activation 410b may be generated in response to the positive summation event. At a time of the reset activation 410b, a voltage drop 430 may change the output voltage from the positive reference voltage VREF_POS to a value 432 to reset the output voltage to the reset voltage 424. In response to the summation of the photocurrents generated in response to a decrease in illuminance, a decreasing level 434 of the output voltage may be generated. In the example shown, a slope of the decreasing level 434 may indicate a greater rate of change of decreasing illuminance, than a rate of change of increasing illuminance represented by a slope of the increasing level 428. The decreasing level 434 of the output voltage may cross (e.g., reach, exceed, drop below, etc.) the negative reference voltage VREF_NEG. A negative summation event may be generated in response to the output voltage crossing the negative reference voltage VREF_NEG. The signal RST may be generated after the summation event to reset the GCD.

The reset activation 410c may be generated in response to the negative summation event. At a time of the reset activation 410c, a voltage drop 436 may change the output voltage from the negative reference voltage VREF_NEG to a value 438 to reset the output voltage to the reset voltage 424. The GCD may continue to compare the changes in the output voltage to the positive and negative reference voltages in order to generate the summation events.

Figure 17:
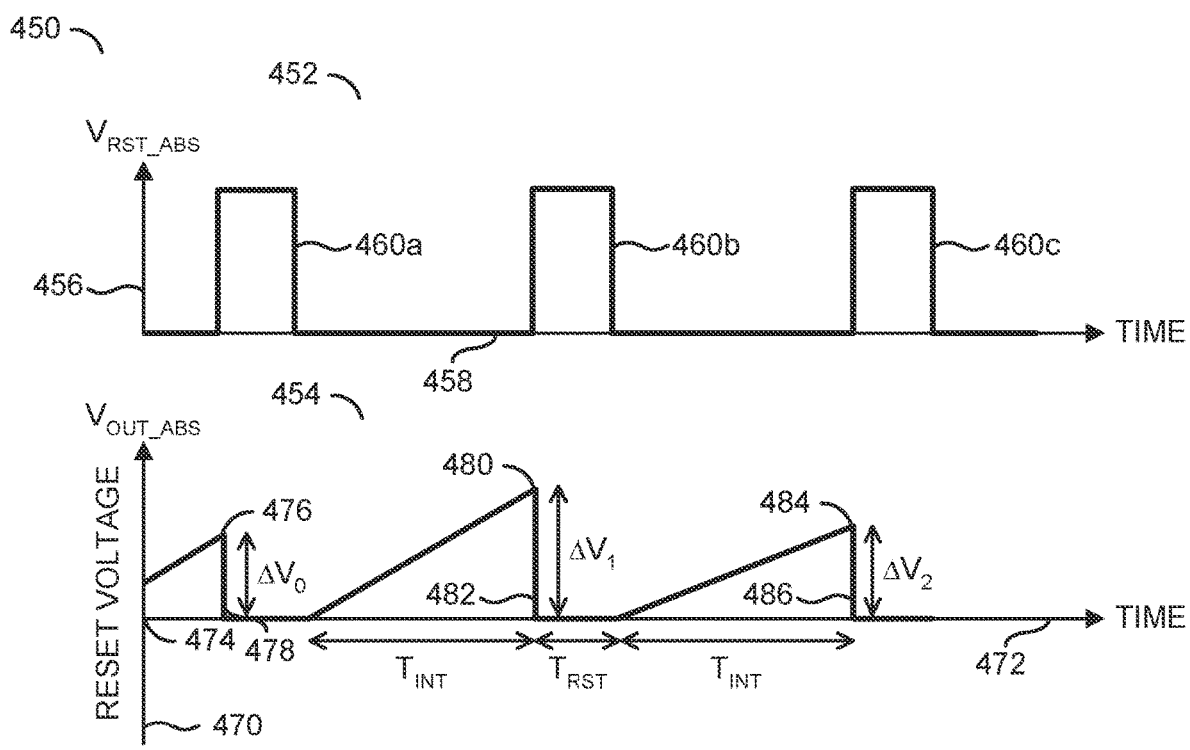
FIG. 17 is a graph illustrating absolute sensing waveforms.

Referring to FIG. 17, a graph illustrating absolute sensing waveforms is shown. Absolute sensing graphs 450 are shown. The absolute sensing graphs 450 may comprise a graph 452, and a graph 454. The graph 452 may be a reset signal graph. The graph 454 may be an absolute voltage output graph.

The reset signal graph 452 may illustrate the signal RST for an AIS implementation of one or more of the GCDs 110a-110m. For example, the reset signal graph 452 may comprise the signal RST as shown in association with FIGS. 8-9. The reset signal graph 452 may comprise an axis 456 and an axis 458. The axis 456 may represent a voltage level of the signal RST. The axis 458 may represent time.

The reset signal graph 452 may comprise a number of reset activations 460a-460c. The reset activations 460a-460c may illustrate when the signal RST has been asserted. In the example shown, the signal RST may be activated at three different times. The reset activations 460a-460c may be generated periodically according to a timing of the reset phase of the AIS. In the example shown, a length of the reset phase (e.g., an amount of time that each of the reset activations 460a-460c may last) may be TRST and a length of the integration phase (e.g., an amount of time in between each of the reset activations 460a-460c) may be TINT. Generally, the length of time TINT for the integration phase may be longer than the length of time TRST for the reset phase. The amount of time for TRST and TINT may be varied according to the design criteria of a particular implementation.

The absolute voltage output graph 454 may illustrate an absolute value of the output voltage. In an example, the absolute value of the output voltage may be the voltage generated by the absolute illumination values circuits 194a-194m shown in association with FIGS. 8-9. The absolute voltage output graph may comprise an axis 470 and an axis 472. The axis 470 may represent the absolute voltage output. The axis 472 may represent time. The reset signal graph 452 and the absolute voltage output graph 454 may be aligned with respect to time.

A reset voltage 474 is shown. The reset voltage 474 may represent a predefined level of reference voltage level that the absolute output voltage is reset to in response to the signal RST. The absolute output voltage may increase based on the change in illuminance. For example, the increase of the output voltage may be determined based on the summation of the photocurrents. Since the summation of the photocurrents may be converted to an absolute value, the output voltage may be a positive value regardless of whether an increase in illuminance or a decrease in illuminance has been detected.

The GCDs 110a-110m that implement AIS may operate in two main phases. One of the phases may be reset and the other of the phases may be integration. The absolute voltage at the end of each integration may be sampled and compared to the absolute voltage of the previous integration sample. The absolute voltage may be reset in the reset phase. The reset phase may be activated in response to the reset activations 460a-460c. In the example shown, the reset activations 460a-460c may be activated periodically. For example, each of the reset activations 460a-460c may be generated after a pre-determined amount of time.

During the integration phase, the absolute voltage output may increase until reaching a peak 476. The peak 476 may be the absolute voltage level when the reset activation 460a is generated to begin the reset phase. A voltage drop 478 may occur in response to the reset activation 460a to reset the absolute voltage output to the reset voltage level 474. A difference between the voltage at the peak 476 and the reset voltage level 474 may be a voltage change $\Delta V0$.

After the end of the reset phase (e.g., when the signal RST is de-asserted at the end of the reset activation 460a), a next integration phase may begin. During the integration phase, the absolute voltage output may increase until reaching a peak 480 (e.g., after an amount of time TINT from the end of the reset phase). The peak 480 may be the absolute voltage level when the reset activation 460b is generated to begin the next reset phase. A voltage drop 482 may occur in response to the reset activation 460b to reset the absolute voltage output to the reset voltage level 474. A difference between the voltage at the peak 480 and the reset voltage level 474 may be a voltage change $\Delta V1$.

The comparators 198a-198m may be configured to compare the current voltage change (e.g., $\Delta V1$) to the previous voltage change (e.g., $\Delta V0$) to determine whether to generate a summation event. In the example shown, the voltage change $\Delta V1$ may be greater than the voltage change $\Delta V0$. In one example, a null value may be used as a threshold value and in response to a positive change comparison between the voltage changes (e.g., $\Delta V1 > \Delta V0$), a positive summation event may be generated. In another example, a difference between the voltage changes may be compared to a predefined positive reference voltage level (e.g., $\Delta V1 - \Delta V0 > \text{VREF\_POS}$) to determine whether to generate the positive summation event. In yet another example, a ratio of the voltage changes may be compared to the positive reference voltage level. For example, the digital core 56 may be configured to program the predefined level for the positive reference voltage. In some embodiments, the positive reference voltage may be a constant (e.g., predefined) threshold value. In some embodiments, the positive reference voltage may be a ratio (or percentage) of the absolute voltage output. The particular values and/or thresholds used for comparing the changes in absolute voltage to determine the positive summation event may be varied according to the design criteria of a particular implementation.

After the end of the reset phase (e.g., when the signal RST is de-asserted at the end of the reset activation 460b), a next integration phase may begin. During the integration phase, the absolute voltage output may increase until reaching a peak 484 (e.g., after an amount of time TINT from the end of the reset phase). The peak 484 may be the absolute voltage level when the reset activation 460c is generated to begin the next reset phase. A voltage drop 486 may occur in response to the reset activation 460c to reset the absolute voltage output to the reset voltage level 474. A difference between the voltage at the peak 484 and the reset voltage level 474 may be a voltage change $\Delta V2$.

The comparators 198a-198m may be configured to compare the current voltage change (e.g., $\Delta V2$) to the previous voltage change (e.g., ΔV1) to determine whether to generate a summation event. In the example shown, the voltage change ΔV2 may be less than the voltage change ΔV1. In one example, a null value may be used as a threshold value and in response to a negative change comparison between the voltage changes (e.g., ΔV2<ΔV1), a negative summation event may be generated. In another example, a difference between the voltage changes may be compared to a predefined negative reference voltage level (e.g., ΔV2−ΔV1<VREF_NEG) to determine whether to generate the negative summation event. In yet another example, a ratio of the voltage changes may be compared to the negative reference voltage level. For example, the digital core 56 may be configured to program the predefined level for the negative reference voltage. In some embodiments, the negative reference voltage may be a constant (e.g., predefined) threshold value. In some embodiments, the negative reference voltage may be a ratio (or percentage) of the absolute voltage output. The particular values and/or thresholds used for comparing the changes in absolute voltage to determine the negative summation event may be varied according to the design criteria of a particular implementation.

The AIS may continually repeat the integration and reset phases to determine the changes in voltage. After each integration phase, the currently detected voltage change may be compared to the previously detected voltage change. If the difference of the voltage changes is positive, a positive summation event may be generated. If the difference of the voltage changes is negative, a negative summation event may be generated. Switching between the reset and integration phase may be performed by the CTIA circuits 192a-192m (shown in association with FIG. 11).

Figure 18:
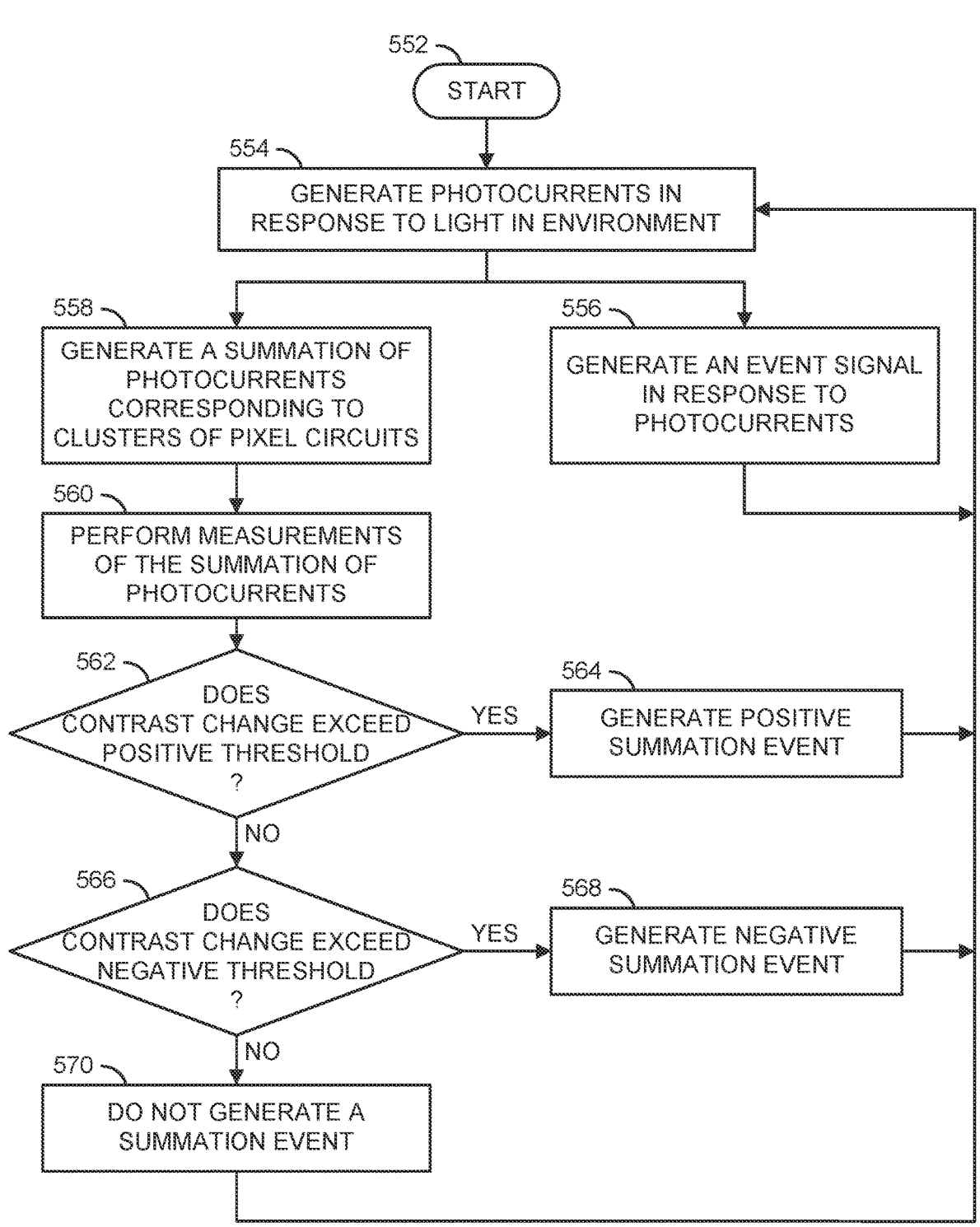
FIG. 18 is a flow diagram illustrating a method for implementing global and cluster contrast detection in vision neuromorphic sensors.

Referring to FIG. 18, a method (or process) 550 is shown. The method 550 may implement global and cluster contrast detection in vision neuromorphic sensors. The method 550 generally comprises a step (or state) 552, a step (or state) 554, a step (or state) 556, a step (or state) 558, a step (or state) 560, a decision step (or state) 562, a step (or state) 564, a decision step (or state) 566, a step (or state) 568, and a step (or state) 570.

The step 552 may start the method 550. In the step 554, the photodiodes 50a-50n may each generate one of the photocurrents IPHOTO[0-N] in response to the light input LIN detected in the environment near the apparatus 100. The photocurrents IPHOTO[0-N] may be presented to pixels 60a-60n of the pixel array 52. Next, the method 550 may move to the step 556 and the step 558.

In the step 556, the pixels 60a-60n may each be configured to generate the events (e.g., positive events or negative events) for the event stream EVSTM in response to the photocurrents IPHOTO[0-N]. The pixels 60a-60n may generate events only when the pixel array 52 is activated (e.g., the signal BYPASS is de-asserted). If the signal BYPASS is asserted, the pixel array 52 may be deactivated and no events may be generated. Generally, the step 556 may be performed in parallel and/or substantially in parallel with the steps 558-570. Next, the method 550 may return to the step 554.

In the step 558, each of the clusters 120a-120m of the pixels 60a-60n may generate a summation of the photocurrents IPSUM[0-M]. The summation of the photocurrents IPSUM[0-M] may be presented to the current mirrors 102a-102m and the copied summation of the photocurrents IPCOPY[0-M] may be presented to the GCDs 110a-110m in the GCD array 104. Next, in the step 560, the GCDs 110a-110m may perform measurements on the copied summation of the photocurrents IPCOPY[0-M]. In one example, the measurements may comprise absolute illuminance measurements. In another example, the measurements may comprise relative illumination measurements. In yet another example, the digital core 56 may be configured to select between enabling the GCD array 104 to use absolute illuminance measurements or relative illuminance measurements. Next, the method 550 may move to the decision step 562.

In the decision step 562, the GCDs 110a-110m may determine whether the contrast changes detected exceed a positive threshold. In an example, the contrast changes may be compared by the GCDs 110a-110m for each of the components of the copied summed photocurrents IPCOPY[0-M]. If one or more of the contrast changes do exceed the positive threshold, then the method 550 may move to the step 564. In the step 564, the GCDs 110a-110m may generate a positive summation event (e.g., POS). Next, the method 550 may return to the step 554. In the decision step 562, if the contrast changes do not exceed the positive threshold, then the method 550 may move to the decision step 566.

In the decision step 566, the GCDs 110a-110 may determine whether the contrast changes detected exceed a negative threshold. In an example, the contrast changes may be compared by the GCDs 110a-110m for each of the components of the copied summed photocurrents IPCOPY[0-M]. If one or more of the contrast changes do exceed the negative threshold, then the method 550 may move to the step 568. In the step 568, the GCDs 110a-110m may generate a negative summation event (e.g., NEG). Next, the method 550 may return to the step 554. In the decision step 566, if the contrast changes do not exceed the negative threshold, then the method 550 may move to the step 570.

For illustrative purposes, the steps 562-568 may be shown sequentially. In some embodiments, the steps 562-568 may be performed sequentially. In some embodiments, the steps 562-586 may be performed in parallel and/or substantially in parallel. In the step 570, the GCDs 110a-110m may not generate one of the summation events. Next, the method 550 may return to the step 554.

Figure 19:
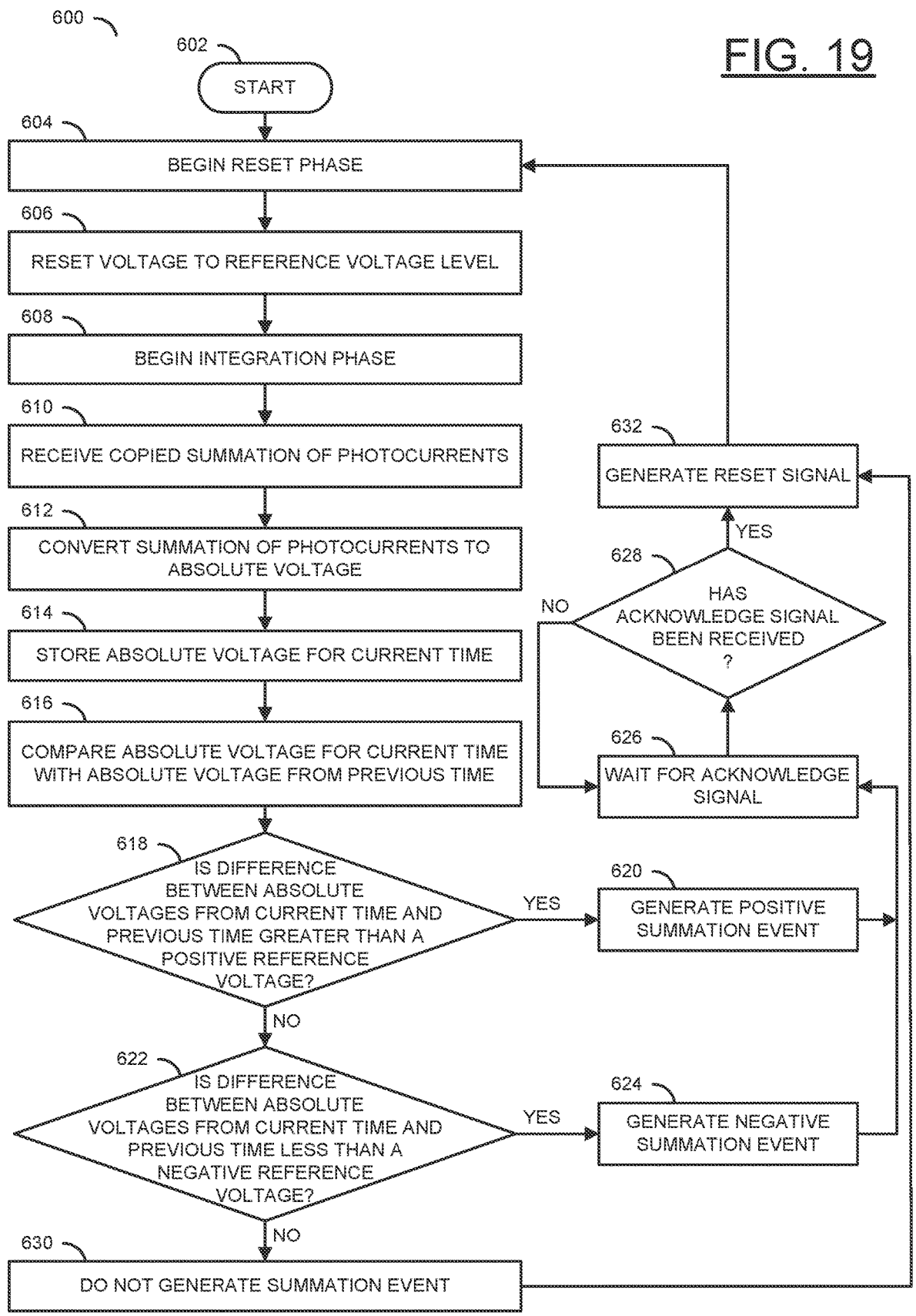
FIG. 19 is a flow diagram illustrating a method for detecting changes in illuminance in a scene using absolute illuminance sensors.

Referring to FIG. 19, a method (or process) 600 is shown. The method 600 may detect changes in illuminance in a scene using absolute illuminance sensors. The method 600 generally comprises a step (or state) 602, a step (or state) 604, a step (or state) 606, a step (or state) 608, a step (or state) 610, a step (or state) 612, a step (or state) 614, a step (or state) 616, a decision step (or state) 618, a step (or state) 620, a decision step (or state) 622, a step (or state) 624, a step (or state) 626, a decision step (or state) 628, a step (or state) 630, and a step (or state) 632.

The step 602 may start the method 600. In the step 604, the GCDs 110a-110m implementing AIS may begin a reset phase. In one example, the reset switch 290 of the current integrators 192a-192m may initiate the reset phase (e.g., reset the voltage to a predefined reset level). In the step 606, in the reset phase, the absolute illumination values circuits 194a-194m may set the absolute output voltage to a reset reference level. Next, in the step 608, the GCDs 110a-110m implementing the AIS may begin an integration phase. In one example, the reset switch 290 of the current integrators 192a-192m may initiate the integration phase. Next, the method 600 may move to the step 610.

In the step 610, the current integrators 192a-192m may receive the copied summation of the photocurrents IPCOPY[0-M]. Next, in the step 612, the absolute illumination values circuits 194a-194m may convert the summation of the photocurrents to an absolute voltage. In the step 614, the absolute illumination values circuits 194a-194m may store the absolute voltage for a current time (e.g., to be used for comparison in an upcoming current integration phase). Next, in the step 616, the subtraction circuits 196a-196m may determine a difference between the absolute voltage for the current time (e.g., the current integration phase) and the absolute voltage from a previous time (e.g., the stored absolute voltage generated during the previous integration phase) to enable the comparators 198a-198m to compare the current absolute voltage value with the previous absolute voltage value. Next, the method 600 may move to the decision step 618.

In the decision step 618, the comparators 198a-198m may determine whether the difference between the current absolute voltage value and the previous absolute voltage value is greater than the positive reference voltage. In an example, the delta between the absolute voltage and the reset values may be determined and subtracted to determine the amount of contrast change between a sequence of two integration phases. The difference may be compared to the positive reference voltage value VREF_POS. If the difference between the absolute voltage values is greater than the positive reference voltage, then the method 600 may move to the step 620. In the step 620, the comparators 198a-198m may generate the positive summation event (e.g., POS). Next, the method 600 may move to the step 626. In the decision step 618, if the difference between the absolute voltage values is not greater than the positive reference voltage, then the method 600 may move to the decision step 622.

In the decision step 622, the comparators 198a-198m may determine whether the difference between the current absolute voltage value and the previous absolute voltage value is less than the negative reference voltage. In an example, the delta between the absolute voltage and the reset values may be determined and subtracted to determine the amount of contrast change between a sequence of two integration phases. The difference may be compared to the negative reference voltage value VREF_NEG. If the difference between the absolute voltage values is less than the negative reference voltage, then the method 600 may move to the step 624. In the step 624, the comparators 198a-198m may generate the negative summation event (e.g., NEG). Next, the method 600 may move to the step 626. In the step 626, the GCD handshake logic 162 may wait for the acknowledge signal ACKB. Next, the method 600 may move to the decision step 628.

In the decision step 628, the GCD handshake logic 162 may determine whether the acknowledge signal ACKB has been received. If the acknowledge signal ACKB has not been received yet, then the method 600 may return to the step 626. If the acknowledge signal ACKB has been received, then the method 600 may move to the step 632.

In the decision step 622, If the difference between the absolute voltage values is not less than the negative reference voltage, then the method 600 may move to the step 630. For illustrative purposes, the steps 618-624 may be shown sequentially. However, one or more of the steps 618-624 may be performed in parallel and/or substantially in parallel. In the step 630, the GCDs 110a-110m may not generate a summation event (e.g., there may not have been a significant amount of illuminance change for the particular pixel clusters 120a-120m since the last integration phase). Next, the method 600 may move to the step 632. In the step 632, the GCD handshake logic 162 may generate the reset signal RST to begin the next reset phase. Next, the method 600 may return to the step 604.

Figure 20:
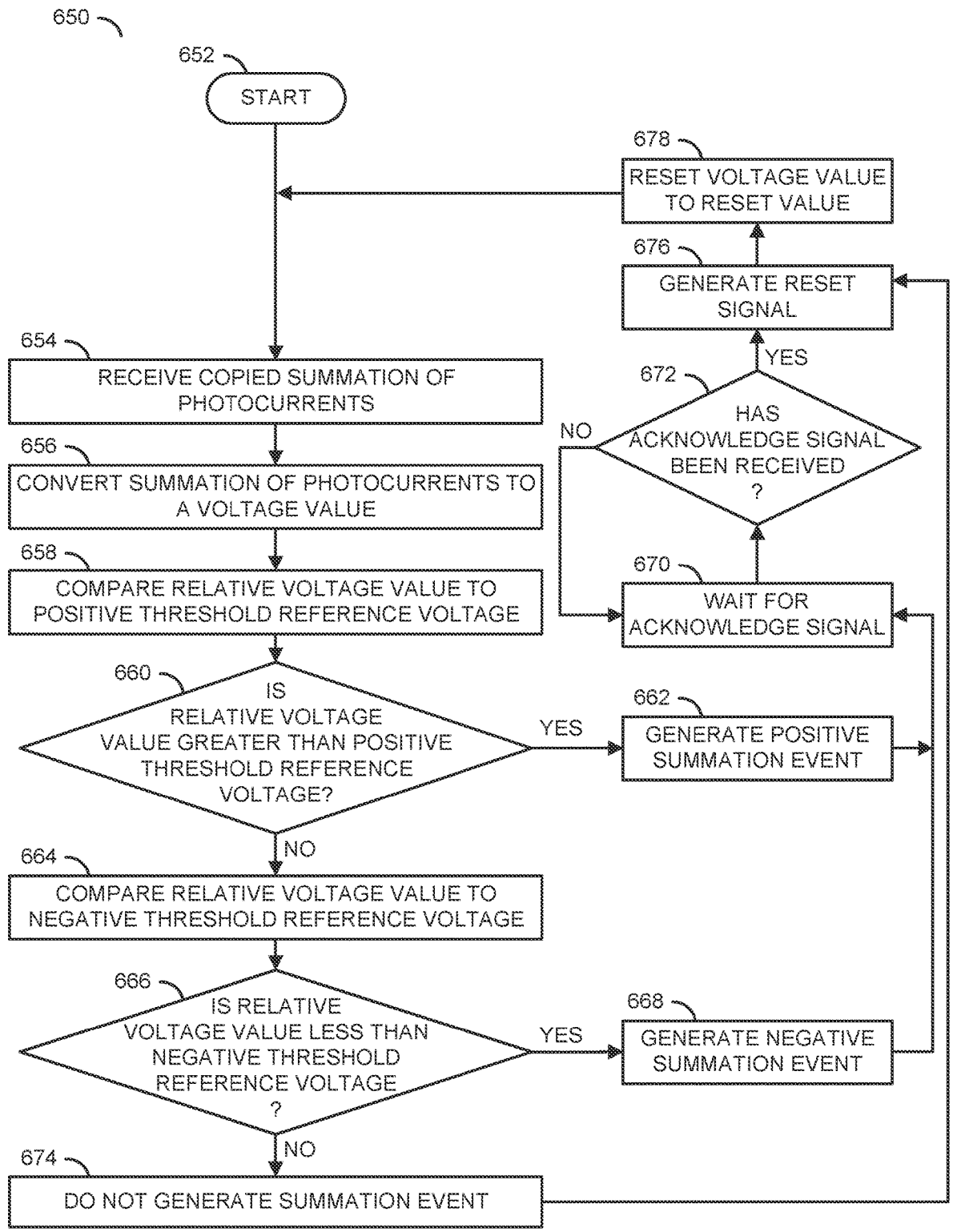
FIG. 20 is a flow diagram illustrating a method for detecting chances in illuminance in a scene using relative illuminance sensors.

Referring to FIG. 20, a method (or process) 650 is shown. The method 650 may detect chances in illuminance in a scene using relative illuminance sensors. The method 650 generally comprises a step (or state) 652, a step (or state) 654, a step (or state) 656, a step (or state) 658, a decision step (or state) 660, a step (or state) 662, a step (or state) 664, a decision step (or state) 666, a step (or state) 668, a step (or state) 670, a decision step (or state) 672, a step (or state) 674, a step (or state) 676, and a step (or state) 678.

The step 652 may start the method 650. In some embodiments, the digital core 56 may program a low-pass filter bandwidth, reference voltages, biasing, etc. based on the scene captured. In the step 654, the GCD front-end circuits 152a-152m may receive the copied summation of the photocurrents IPCOPY[0-M]. Next, in the step 656, the GCD front-end circuits 152a-152m may convert the summation of the photocurrents to a voltage value (e.g., GC_DPR_OUT). The GCD circuits 110a-110m may be further configured to implement the GCD low-pass filters 154a-154m to perform low-pass filtering and buffering on the voltage value and the GCD high pass and gain stages 156a-156m to generate a relative voltage value in response to a gain operation and perform a high-pass filtering. Next, in the step 658, the GCD comparators 158a-158m may compare the relative voltage value to the positive voltage threshold VREF_POS. Next, the method 650 may move to the decision step 660.

In the decision step 660, the GCD comparators 158a-158m may determine whether the relative voltage value is greater than the positive threshold reference voltage. If the relative voltage value is greater, then the method 650 may move to the step 662. In the step 662, the GCD comparators 158a-158m may generate the positive summation event (e.g., POS). Next, the method 650 may move to the step 670. In the decision step 660, if the relative voltage value is not greater than the positive threshold reference voltage, then the method 650 may move to the step 664. In the step 664, the GCD comparators 158a-158m may compare the relative voltage value to the negative voltage threshold VREF_NEG. Next, the method 650 may move to the decision step 666.

In the decision step 666, the GCD comparators 158a-158m may determine whether the relative voltage value is less than the negative threshold reference voltage. If the relative voltage value is less, then the method 650 may move to the step 668. In the step 668, the GCD comparators 158a-158m may generate the negative summation event (e.g., NEG). Next, the method 650 may move to the step 670. In the step 670, the GCD handshake logic 162 may wait for the acknowledge signal ACKB. Next, the method 650 may move to the decision step 672.

In the decision step 672, the GCD handshake logic 162 may determine whether the acknowledge signal ACKB has been received from the digital core 56. If the acknowledge signal ACKB has not been received, then the method 650 may return to the step 670. If the acknowledge signal ACKB has been received, then the method 650 may move to the step 676.

In the decision step 666, if the relative voltage value is not less than the negative threshold reference voltage, then the method 650 may move to the step 674. For illustrative purposes, the steps 658-668 may be shown sequentially. However, one or more of the steps 658-668 may be performed in parallel and/or substantially in parallel. In the step 674, the GCDs 110a-110m may not generate a summation event (e.g., there may not have been a significant amount of illuminance change for the particular pixel clusters 120a-120m). Next, the method 650 may move to the step 676. In the step 676, the GCD handshake logic 162 may generate the reset signal RST. In the step 678, the relative voltage value may be reset to the reset voltage level. Next, the method 650 may return to the step 654.

The invention claimed is:

1. An event-based vision sensor comprising:
an array of pixel circuits, each configured to produce a respective photocurrent, wherein the array of pixel circuits is divided into one or more clusters of multiple pixel circuits, each pixel circuit comprising a photodiode connected to generate the photocurrent of the pixel circuit between a ground and a node common to all pixel circuits of the cluster; and
a cluster control circuit configured, for each cluster, to generate (i) a summation of the photocurrents produced by the pixel circuits of the cluster and (ii) cluster events based on changes in the summation of the photocurrents, the cluster control circuit comprising a cluster current sensor connected between the common node and a voltage source for measuring the summation of the photocurrents;
wherein each pixel circuit of a cluster further comprises:
a transimpedance amplifier connected between the photodiode and the common node to sense the photocurrent, the transimpedance amplifier including a bias current source; and
a bypass switch connected between the photodiode and the common node.

2. The vision sensor of claim 1, wherein the cluster control circuit is configured to control a mode of operation of the vision sensor, including:
(i) a normal mode where the bypass switches of all pixel circuits are turned off, whereby the vision sensor is capable of generating both individual pixel events and cluster events; and
(ii) a standby mode where the bypass switches are turned on for a number of clusters and the current sources of the pixel circuits of the number of clusters are turned off, whereby the vision sensor is capable of generating only cluster events for the number of clusters while the pixel circuits of the number of clusters are inactive and consume no current.

3. The vision sensor of claim 1, comprising a digital core configured to process cluster events, wherein the cluster control circuit is configured to:
(i) in the standby mode, turn off the digital core and evaluate cluster events;
(ii) when a cluster event indicates a threshold crossing, turn on the digital core to process the cluster events; and
(iii) when the digital core determines that the cluster events match a condition, switch the vision sensor in normal mode.

4. The vision sensor of claim 3, wherein the digital core is configured to:
upon turning on, process the cluster events as a low-resolution event map, and
when a higher resolution event map is desirable, switch the sensor to the normal mode for processing a high resolution event map comprised of the individual pixel circuits of the array.

5. The vision sensor of claim 3, wherein the digital core is configured to:
upon turning on, process the cluster events for detecting undesirable events in individual clusters, and
switch the sensor to a mode in which all the pixel circuits of the array are turned on except those that correspond to clusters in which undesirable events have been detected.

6. The vision sensor of claim 5, wherein the undesirable events include flicker.

7. The vision sensor of claim 1, wherein a cluster is configured to produce an absolute measurement or a relative measurement of an illuminance from the summation of the photocurrents.

8. The vision sensor of claim 7, wherein the cluster control circuit is configured, for the absolute measurement, to compare a current summation of the photocurrents and a previous summation of the photocurrents, and generate a cluster event in response to the comparison.

9. The vision sensor of claim 8, wherein the comparison of the summations is based on (a) a difference between the current summation and the previous summation, or (b) a ratio between the current summation and the previous summation.

10. The vision sensor of claim 1, wherein the cluster control circuit is configured to:
(a) generate a first voltage level for the summation of the photocurrents at an integration sampling time and storing a second voltage level for a previous summation of the photocurrents,
(b) generate a positive cluster event when a comparison of the first voltage level and the second voltage level is greater than a positive threshold, and
(c) generate the negative event when a comparison of the first voltage level and the second voltage level is less than a negative threshold.

11. The vision sensor of claim 10, wherein a capacitive transimpedance amplifier is configured to reset an output voltage to a predefined level after generating the first voltage level.

12. The vision sensor of claim 1, wherein the cluster control circuit is configured to produce a relative measurement of illuminance changes of the summation of the photocurrents and wherein (i) the summation of the photocurrents is converted to a voltage level, and (ii) the voltage level is reset to a predefined level after the cluster event is generated.

13. The vision sensor of claim 12, wherein the cluster control circuit is configured to (i) compare the voltage level to a positive threshold, (ii) generate a positive event if the voltage level is greater than the positive threshold, (iii) compare the voltage level to a negative threshold and (iv) generate a negative event if the voltage level is less than the negative threshold.

14. The vision sensor of claim 1, wherein a cluster of pixels corresponds to any of (i) a number of rows and columns of pixel circuits, (ii) one or more rows of pixel circuits, (iii) one or more columns of pixel circuits, (iv) a subset of the array of pixel circuits, and (v) the array of pixel circuits.

* * * * *